US012666441B2

(12) United States Patent (10) Patent No.: US 12,666,441 B2
Xue et al. (45) Date of Patent: Jun. 23, 2026

(54) RESOURCE DETERMINING METHOD AND APPARATUS

(71) Applicant: HUAWEI TECHNOLOGIES CO., LTD., Shenzhen (CN)

(72) Inventors: Yifan Xue, Beijing (CN); Lixia Xue, Beijing (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 542 days.

(21) Appl. No.: 18/246,002

(22) PCT Filed: Aug. 10, 2021

(86) PCT No.: PCT/CN2021/111904
§ 371 (c)(1),
(2) Date: Mar. 20, 2023

(87) PCT Pub. No.: WO2022/057524
PCT Pub. Date: Mar. 24, 2022

(65) Prior Publication Data
US 2023/0354366 A1 Nov. 2, 2023

(30) Foreign Application Priority Data

Sep. 21, 2020 (CN) .......................... 202010998233.0
Oct. 16, 2020 (CN) ........................... 202011113021.6

(51) Int. Cl.
*H04W 72/232* (2023.01)
*H04L 5/00* (2006.01)

(52) U.S. Cl.
CPC ......... *H04W 72/232* (2023.01); *H04L 5/0053* (2013.01)

(58) Field of Classification Search
CPC ........................... H04W 72/232; H04L 5/0053
See application file for complete search history.

(56) References Cited

U.S. PATENT DOCUMENTS 10,455,573 B2 * 10/2019 Kwak ................... H04L 5/0053
10,805,914 B2 * 10/2020 Park .................. H04W 72/0453
(Continued)

FOREIGN PATENT DOCUMENTS

| EP | 3661287 A1 | 6/2020 |
| EP | 3866539 A1 | 8/2021 |
| WO | 2020094110 A1 | 5/2020 |

OTHER PUBLICATIONS

Extended European Search Report in European Appln No. 21868352.2, dated Feb. 15, 2024, 12 pages.

*Primary Examiner* — Ayman A Abaza
*Assistant Examiner* — Van Ta Nguyen
(74) *Attorney, Agent, or Firm* — Fish & Richardson P.C.

(57) ABSTRACT

A communications device determines index values of n first control channel elements (CCEs) occupied by a physical downlink control channel (PDCCH) candidate in a control resource set (CORESET) in a first CCE set and index values of m second CCEs occupied by the PDCCH candidate in the CORESET in a second CCE set. The CORESET is divided into a first second physical time-frequency resource area and a second physical time-frequency resource area. The first physical time-frequency resource area is different from the second physical time-frequency resource area in time domain and/or frequency domain. A quantity of CCEs included in the first CCE set is determined based on a quantity of resource element groups (REGs) included in a first physical time-frequency resource. A quantity of CCEs included in the second CCE set is determined based on a quantity of REGs included in a second physical time-frequency resource.

20 Claims, 18 Drawing Sheets

(56)             References Cited

U.S. PATENT DOCUMENTS

| | | | | |
|---|---|---|---|---|
| 10,924,215 B2 * | 2/2021 | Kim | .................... | H04L 1/0035 |
| 11,096,163 B2 * | 8/2021 | Kwak | .................... | H04L 5/001 |
| 2020/0367242 A1 * | 11/2020 | Moon | .................... | H04L 5/0048 |
| 2020/0412515 A1 * | 12/2020 | Xu | .................... | H04W 4/70 |
| 2021/0266837 A1 * | 8/2021 | Chen | .................... | H04W 24/10 |

* cited by examiner

| 0 | 1 | 2 | 3 | 4 | 5 |
|---|---|---|---|---|---|
| 0 | 1 | 2 | 3 | 4 | 5 |

| 0 | 1 | 2 | 3 | 4 | 5 |
|---|---|---|---|---|---|
| 0 | 2 | 4 | 1 | 3 | 5 |

Frequency domain

| 0 | 1 | 2 | 3 | 4 | 5 | 6 | 7 | 8 | 9 | 10 | 11 |
|---|---|---|---|---|---|---|---|---|---|----|----|
| 12 | 13 | 14 | 15 | 16 | 17 | 18 | 19 | 20 | 21 | 22 | 23 |

Time domain

FIG. 6(a)

Frequency domain

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |

Time domain

FIG. 6(b)

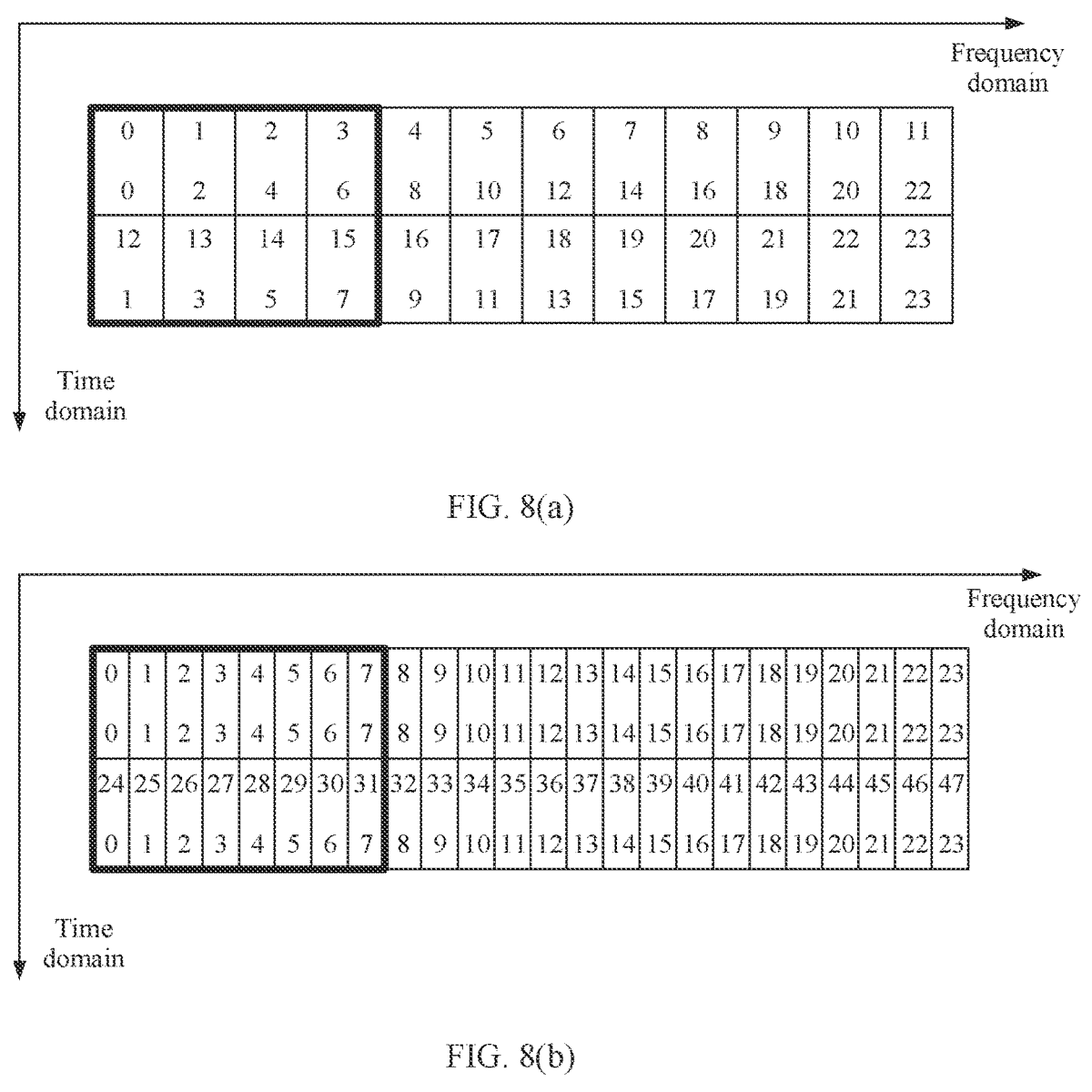

Frequency
domain

| 0 | 1 | 2 | 3 | 4 | 5 | 6 | 7 | 8 | 9 | 10 | 11 |
|---|---|---|---|---|---|---|---|---|---|----|----|
| 0 | 2 | 4 | 6 | 8 | 10 | 12 | 14 | 16 | 18 | 20 | 22 |
| 12 | 13 | 14 | 15 | 16 | 17 | 18 | 19 | 20 | 21 | 22 | 23 |
| 1 | 3 | 5 | 7 | 9 | 11 | 13 | 15 | 17 | 19 | 21 | 23 |

Time
domain

FIG. 8(a)

Frequency
domain

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

Time
domain

FIG. 8(b)

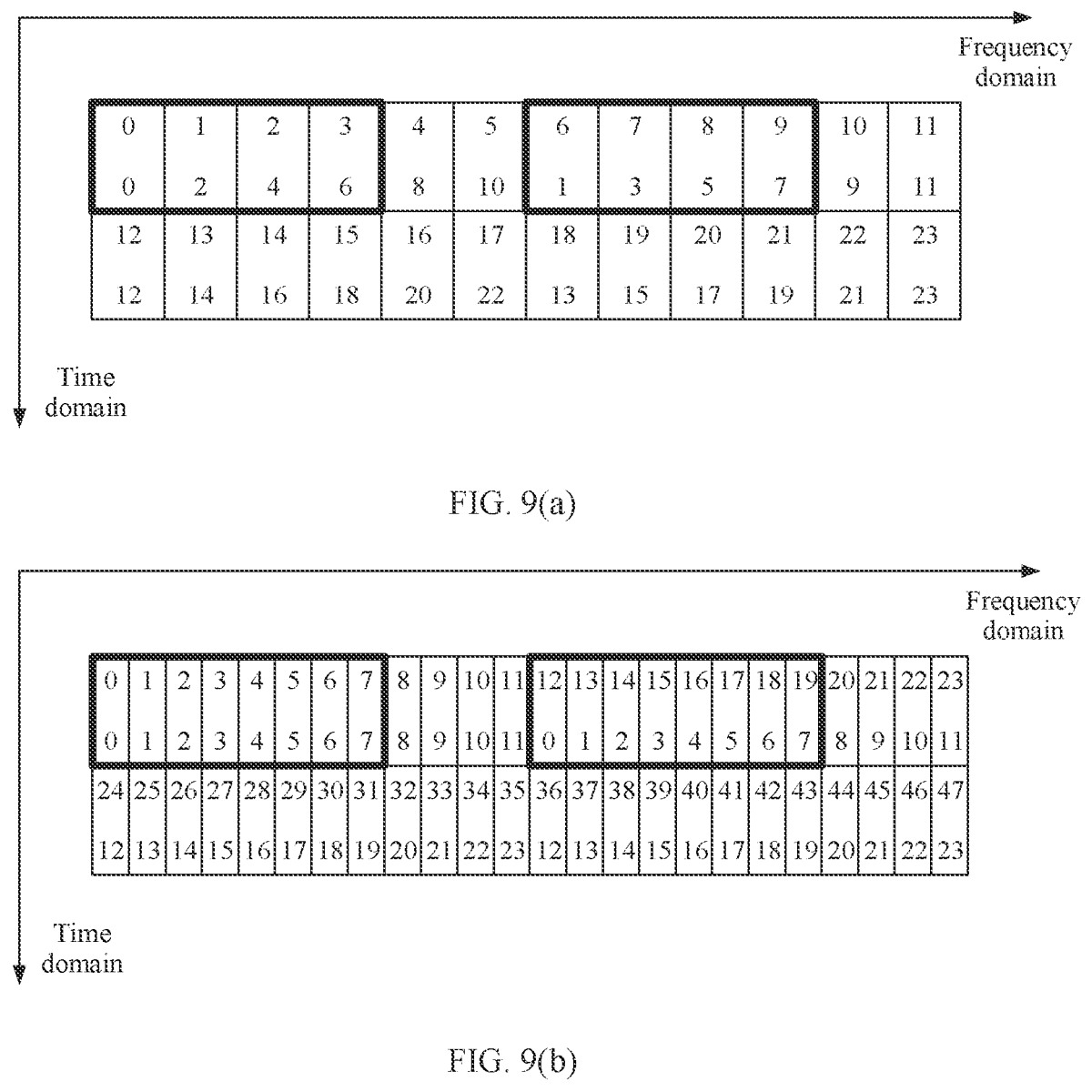

Frequency domain

| 0 | 1 | 2 | 3 | 4 | 5 | 6 | 7 | 8 | 9 | 10 | 11 |
|---|---|---|---|---|---|---|---|---|---|----|----|
| 0 | 2 | 4 | 6 | 8 | 10 | 1 | 3 | 5 | 7 | 9 | 11 |
| 12 | 13 | 14 | 15 | 16 | 17 | 18 | 19 | 20 | 21 | 22 | 23 |
| 12 | 14 | 16 | 18 | 20 | 22 | 13 | 15 | 17 | 19 | 21 | 23 |

Time domain

FIG. 9(a)

Frequency domain

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 0 | 1 | 2 | 3 | 4 | 5 | 6 | 7 | 8 | 9 | 10 | 11 | 0 | 1 | 2 | 3 | 4 | 5 | 6 | 7 | 8 | 9 | 10 | 11 |
| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 12 | 13 | 14 | 15 | 16 | 17 | 18 | 19 | 20 | 21 | 22 | 23 | 12 | 13 | 14 | 15 | 16 | 17 | 18 | 19 | 20 | 21 | 22 | 23 |

Time domain

FIG. 9(b)

A communications device determines, according to a first formula, an index value of each first CCE of n first CCEs occupied by a PDCCH candidate ⟋ S1011

The communications device determines, according to a second formula, an index value of each second CCE of m second CCEs occupied by the PDCCH candidate ⟋ S1012

The communications device determines, based on index values of the n first CCEs and index values of the m second CCEs, a physical time-frequency resource occupied by the PDCCH candidate ⟋ S102

FIG. 13

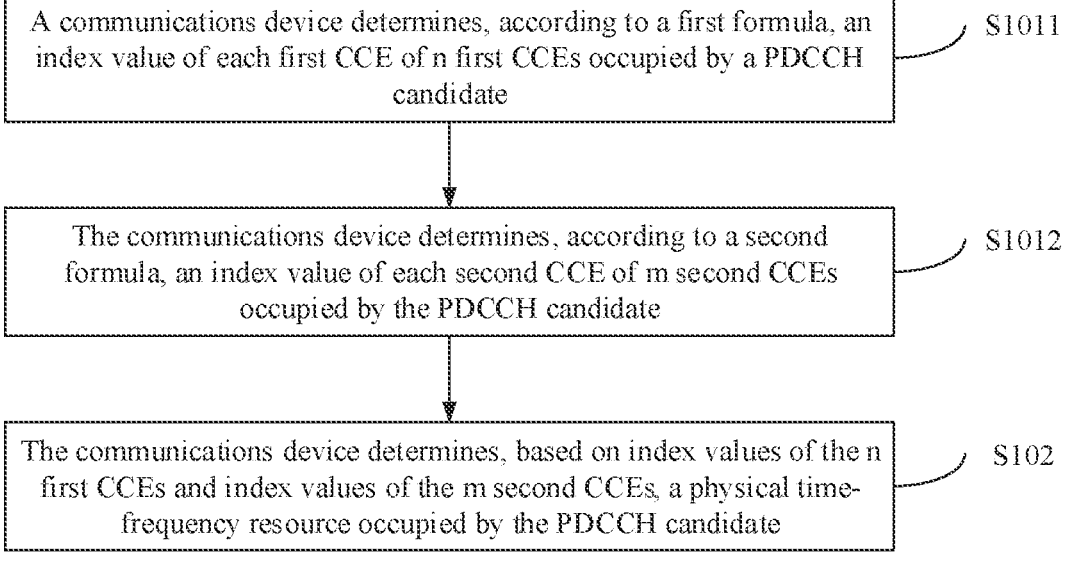

Frequency domain

| 0 | 1 | 2 | 3 | 4 | 5 | 6 | 7 | 8 | 9 | 10 | 11 |
|---|---|---|---|---|---|---|---|---|---|----|----|
| 12 | 13 | 14 | 15 | 16 | 17 | 18 | 19 | 20 | 21 | 22 | 23 |

Time domain

FIG. 14

Frequency domain

| 0 | 1 | 2 | 3 | 4 | 5 | 6 | 7 | 8 | 9 | 10 | 11 |
|---|---|---|---|---|---|---|---|---|---|----|----|
| 0 | 2 | 4 | 6 | 8 | 10 | 12 | 14 | 16 | 18 | 20 | 22 |
| 12 | 13 | 14 | 15 | 16 | 17 | 18 | 19 | 20 | 21 | 22 | 23 |
| 1 | 3 | 5 | 7 | 9 | 11 | 13 | 15 | 17 | 19 | 21 | 23 |

Time domain

FIG. 15

Frequency domain

| 0 | 1 | 2 | 3 | 4 | 5 | 6 | 7 | 8 | 9 | 10 | 11 |
|---|---|---|---|---|---|---|---|---|---|----|----|
| 0 | 2 | 4 | 6 | 8 | 10 | 1 | 3 | 5 | 7 | 9 | 11 |
| 12 | 13 | 14 | 15 | 16 | 17 | 18 | 19 | 20 | 21 | 22 | 23 |
| 12 | 14 | 16 | 18 | 20 | 22 | 13 | 15 | 17 | 19 | 21 | 23 |

Time domain

FIG. 16

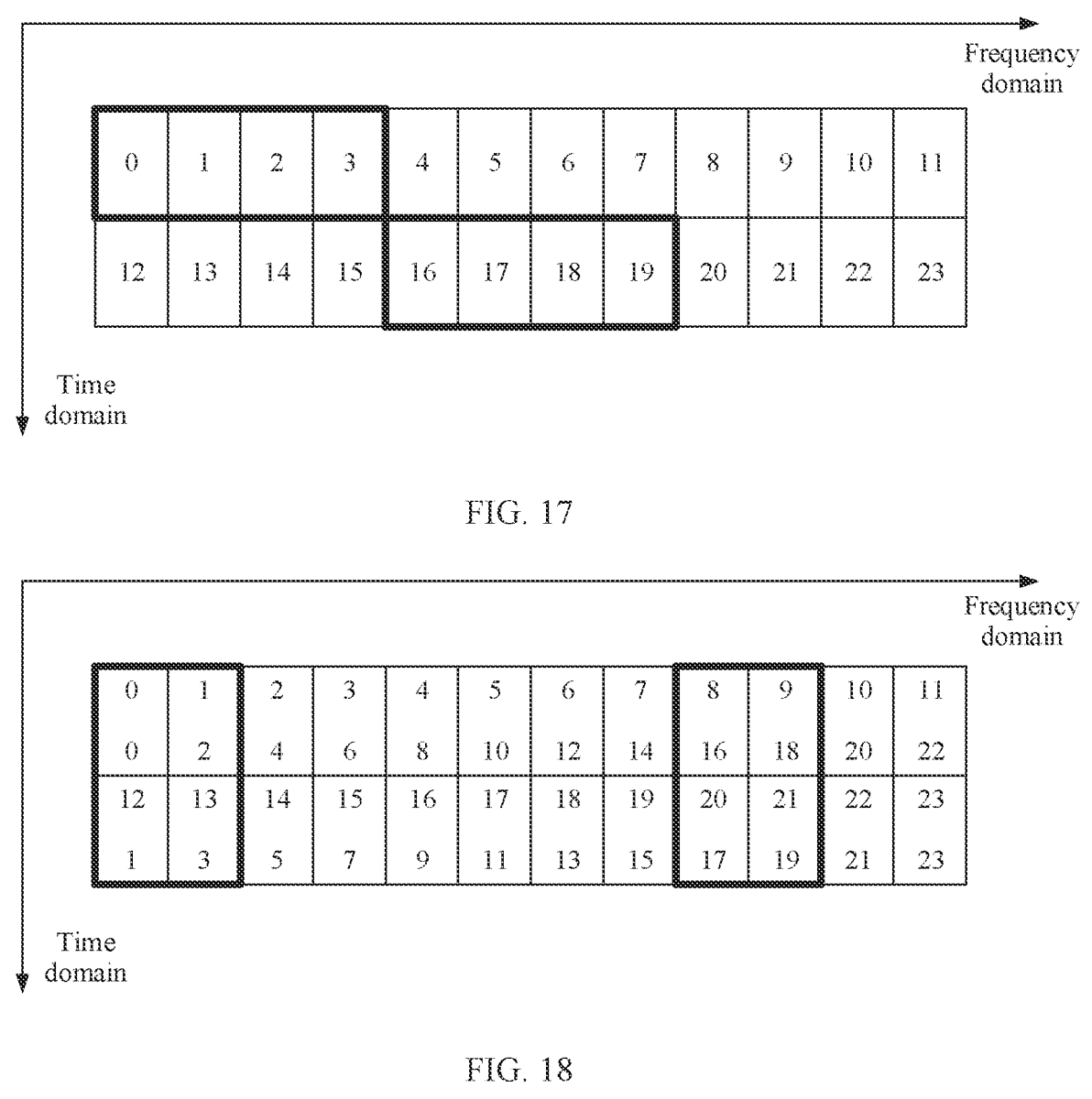

Frequency
domain

| 0 | 1 | 2 | 3 | 4 | 5 | 6 | 7 | 8 | 9 | 10 | 11 |
| 12 | 13 | 14 | 15 | 16 | 17 | 18 | 19 | 20 | 21 | 22 | 23 |

Time
domain

FIG. 17

Frequency
domain

| 0 | 1 | 2 | 3 | 4 | 5 | 6 | 7 | 8 | 9 | 10 | 11 |
| 0 | 2 | 4 | 6 | 8 | 10 | 12 | 14 | 16 | 18 | 20 | 22 |
| 12 | 13 | 14 | 15 | 16 | 17 | 18 | 19 | 20 | 21 | 22 | 23 |
| 1 | 3 | 5 | 7 | 9 | 11 | 13 | 15 | 17 | 19 | 21 | 23 |

Time
domain

FIG. 18

Frequency
domain

| 0 | 1 | 2 | 3 | 4 | 5 | 6 | 7 | 8 | 9 | 10 | 11 |
|---|---|---|---|---|---|---|---|---|---|----|----|
| 0 | 2 | 4 | 6 | 8 | 10 | 1 | 3 | 5 | 7 | 9 | 11 |
| 12 | 13 | 14 | 15 | 16 | 17 | 18 | 19 | 20 | 21 | 22 | 23 |
| 12 | 14 | 16 | 18 | 20 | 22 | 13 | 15 | 17 | 19 | 21 | 23 |

Time
domain

Frequency
domain

| 0 | 1 | 2 | 3 | 4 | 5 | 6 | 7 | 8 | 9 | 10 | 11 |
|---|---|---|---|---|---|---|---|---|---|----|----|
| 12 | 13 | 14 | 15 | 16 | 17 | 18 | 19 | | | | |

Time
domain

A communications device determines whether a second CCE set can provide m second CCEs for a PDCCH candidate whose number is $m_{s,n_{CI}}$ and whose aggregation level is L                    S201

Yes

The communications device determines index values of n first CCEs occupied by the PDCCH candidate in a CORESET in a first CCE set and index values of m second CCEs occupied by the PDCCH candidate in the CORESET in the second CCE set          S101

The communications device determines, based on the index values of the n first CCEs and the index values of the m second CCEs, a physical time-frequency resource occupied by the PDCCH candidate          S102

FIG. 21

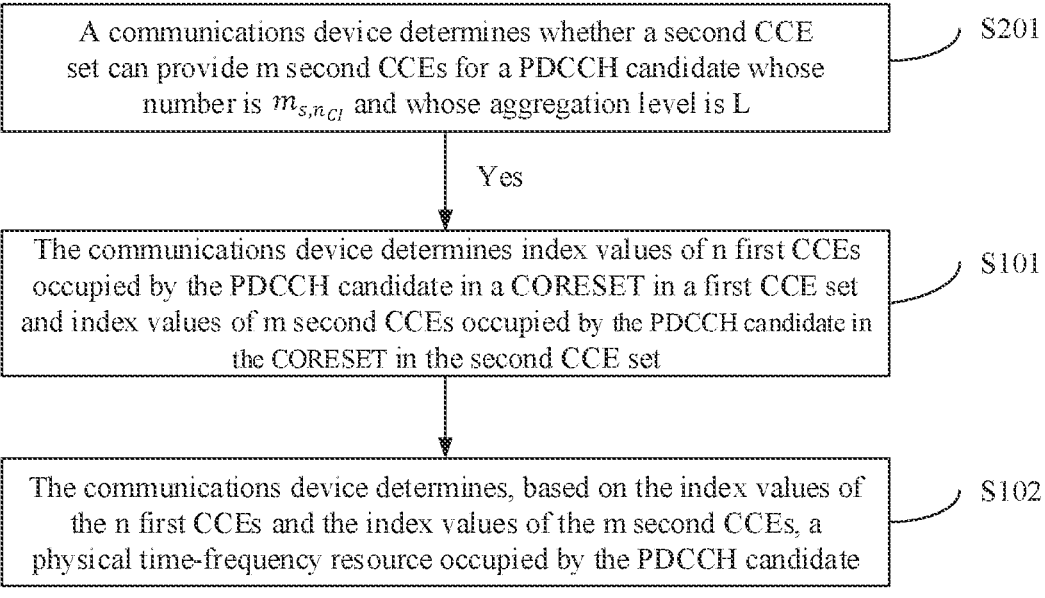

FIG. 22

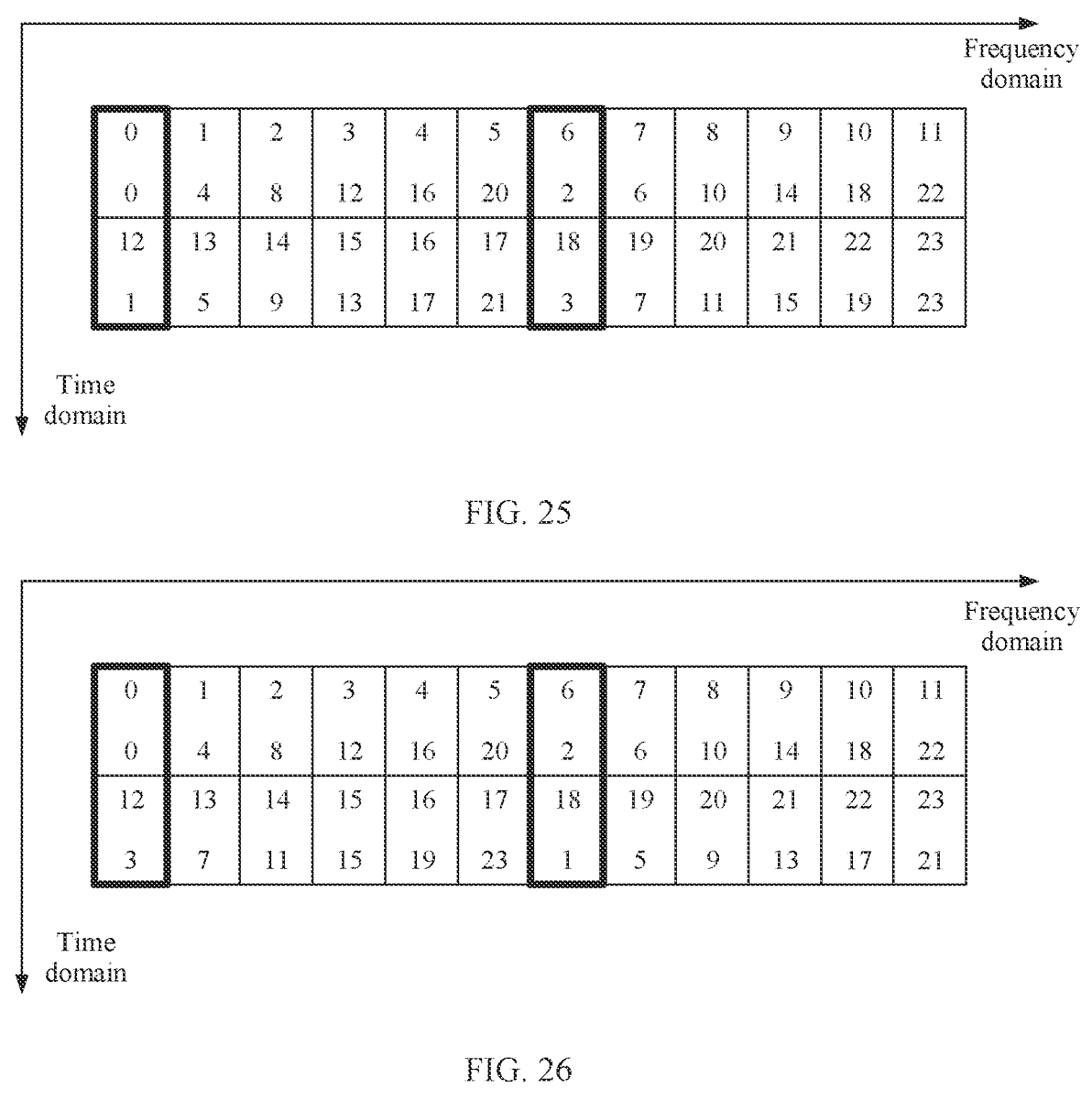

Frequency domain

| 0 | 1 | 2 | 3 | 4 | 5 | 6 | 7 | 8 | 9 | 10 | 11 |
|---|---|---|---|---|---|---|---|---|---|----|----|
| 0 | 4 | 8 | 12 | 16 | 20 | 2 | 6 | 10 | 14 | 18 | 22 |
| 12 | 13 | 14 | 15 | 16 | 17 | 18 | 19 | 20 | 21 | 22 | 23 |
| 1 | 5 | 9 | 13 | 17 | 21 | 3 | 7 | 11 | 15 | 19 | 23 |

Time domain

FIG. 25

Frequency domain

| 0 | 1 | 2 | 3 | 4 | 5 | 6 | 7 | 8 | 9 | 10 | 11 |
|---|---|---|---|---|---|---|---|---|---|----|----|
| 0 | 4 | 8 | 12 | 16 | 20 | 2 | 6 | 10 | 14 | 18 | 22 |
| 12 | 13 | 14 | 15 | 16 | 17 | 18 | 19 | 20 | 21 | 22 | 23 |
| 3 | 7 | 11 | 15 | 19 | 23 | 1 | 5 | 9 | 13 | 17 | 21 |

Time domain

FIG. 26

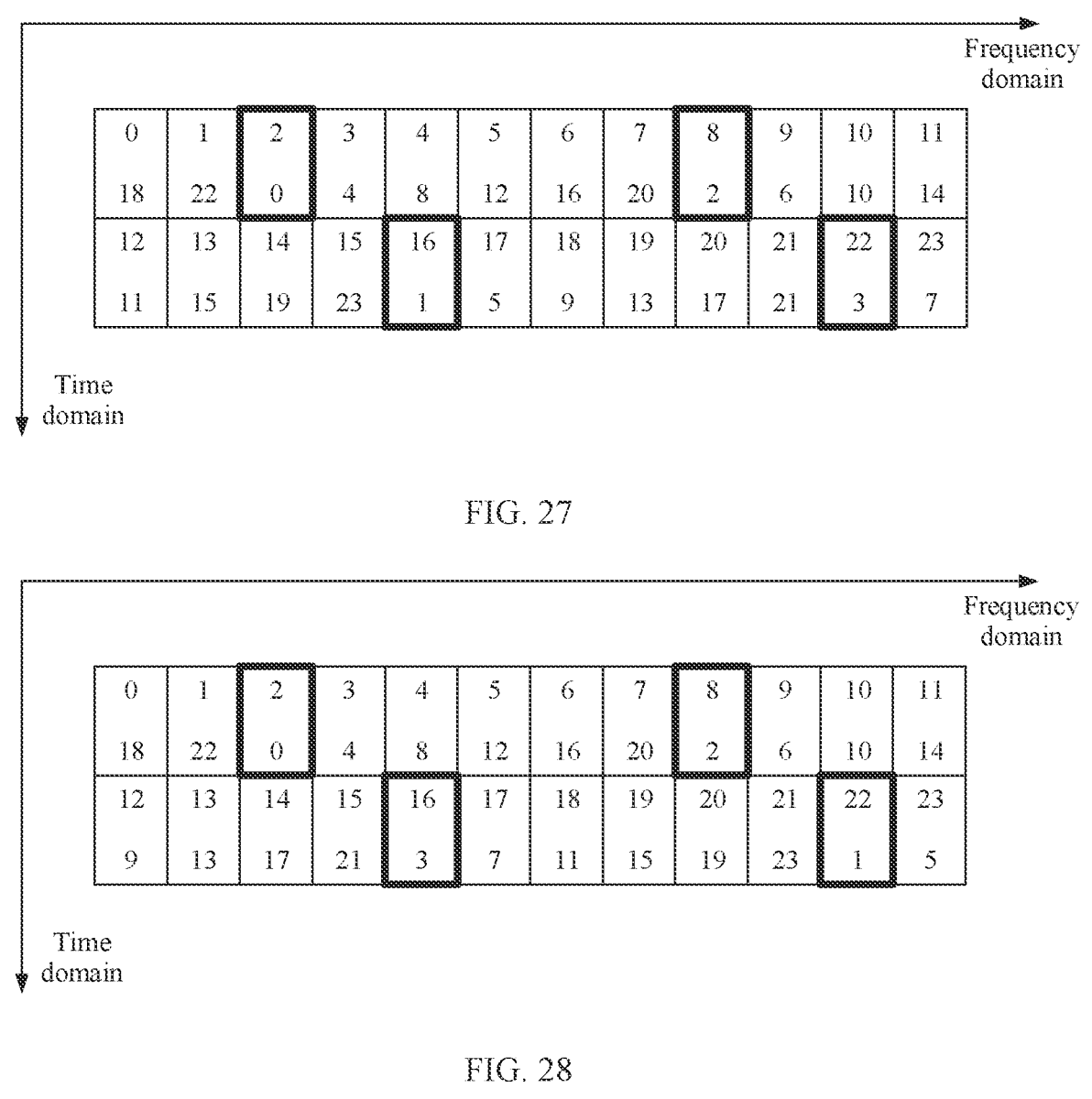

Frequency
domain

| 0 | 1 | 2 | 3 | 4 | 5 | 6 | 7 | 8 | 9 | 10 | 11 |
|---|---|---|---|---|---|---|---|---|---|----|----|
| 18 | 22 | 0 | 4 | 8 | 12 | 16 | 20 | 2 | 6 | 10 | 14 |
| 12 | 13 | 14 | 15 | 16 | 17 | 18 | 19 | 20 | 21 | 22 | 23 |
| 11 | 15 | 19 | 23 | 1 | 5 | 9 | 13 | 17 | 21 | 3 | 7 |

Time
domain

FIG. 27

Frequency
domain

| 0 | 1 | 2 | 3 | 4 | 5 | 6 | 7 | 8 | 9 | 10 | 11 |
|---|---|---|---|---|---|---|---|---|---|----|----|
| 18 | 22 | 0 | 4 | 8 | 12 | 16 | 20 | 2 | 6 | 10 | 14 |
| 12 | 13 | 14 | 15 | 16 | 17 | 18 | 19 | 20 | 21 | 22 | 23 |
| 9 | 13 | 17 | 21 | 3 | 7 | 11 | 15 | 19 | 23 | 1 | 5 |

Time
domain

FIG. 28

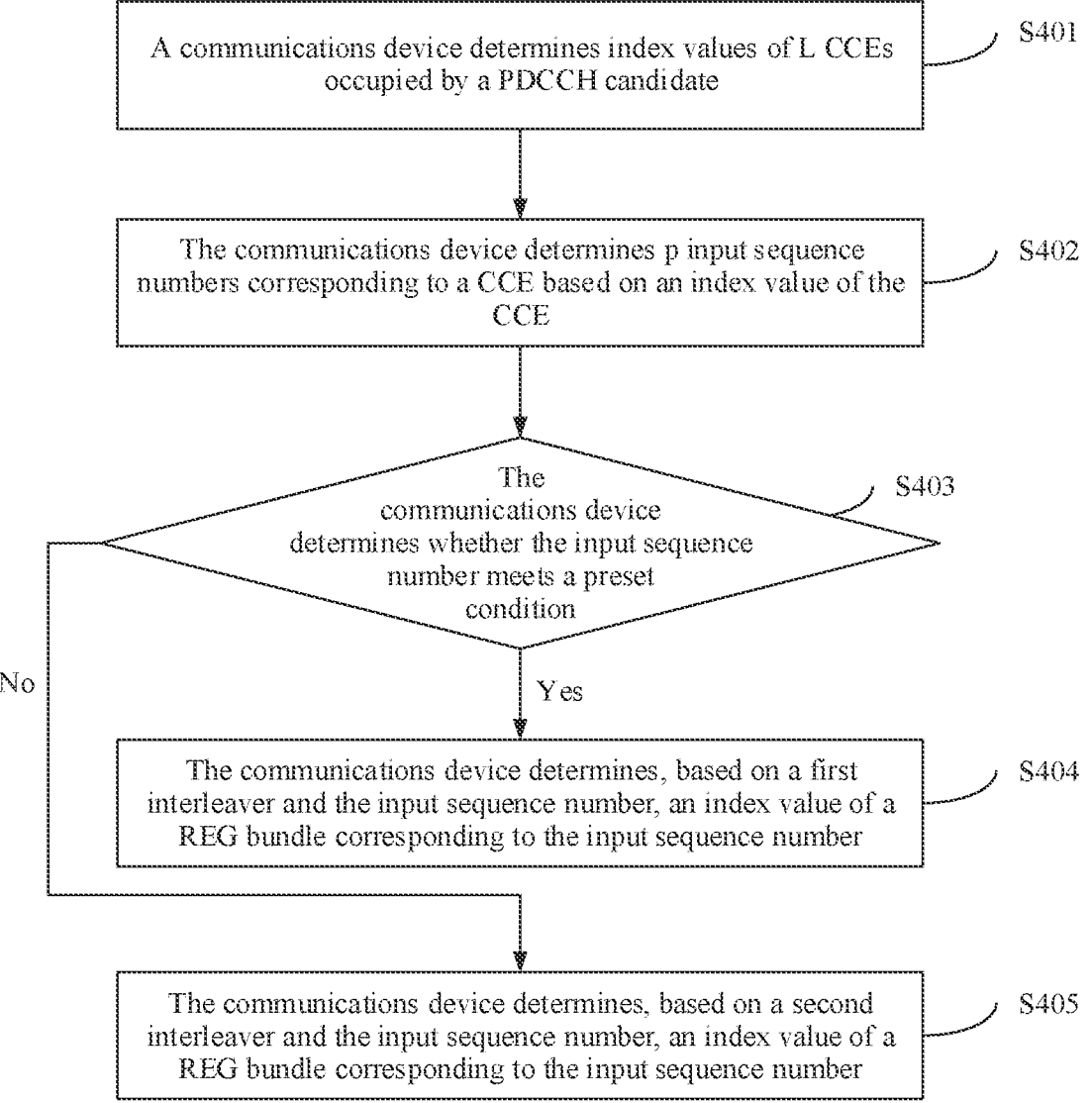

A communications device determines index values of L CCEs occupied by a PDCCH candidate — S401

The communications device determines p input sequence numbers corresponding to a CCE based on an index value of the CCE — S402

The communications device determines whether the input sequence number meets a preset condition — S403

No

Yes

The communications device determines, based on a first interleaver and the input sequence number, an index value of a REG bundle corresponding to the input sequence number — S404

The communications device determines, based on a second interleaver and the input sequence number, an index value of a REG bundle corresponding to the input sequence number — S405

FIG. 29

RESOURCE DETERMINING METHOD AND APPARATUS

CROSS-REFERENCE TO RELATED APPLICATIONS

This application is a National Stage of International Application No. PCT/CN2021/111904, filed on Aug. 10, 2021, which claims priority to Chinese Patent Application No. 202010998233.0, filed on Sep. 21, 2020, and Chinese Patent Application No. 202011113021.6, filed on Oct. 16, 2020. All of the aforementioned applications are hereby incorporated by reference in their entireties.

TECHNICAL FIELD

This application relates to the field of communication technologies, and in particular, to a resource determining method and an apparatus.

BACKGROUND

To support features such as a high data rate, a low latency, and high reliability of the 5G NR system, an NR terminal device has a strong capability. For example, on a common commercial frequency band, an NR terminal device needs to support 4-antenna reception, 100 MHz system bandwidth, and the like. However, these requirements cause high hardware costs of the NR terminal device. To further expand the NR market and reduce hardware costs of terminal devices, 3GPP has initiated a reduced capability (reduced capability, REDCAP) topic, expecting to reduce complexity and costs of the terminal devices by reducing a quantity of antennas or the like.

For a REDCAP terminal device, as a quantity of receive antennas of the terminal device decreases, a coverage area of a downlink signal accordingly decreases. To improve coverage of a physical downlink control channel (physical downlink control channel, PDCCH), in one manner, a quantity of symbols occupied by a control resource set (control resource set, CORESET) is increased. For example, a quantity of symbols supported by the REDCAP terminal device may be increased to more than three.

A CORESET configuration of the REDCAP terminal device is different from that of a conventional terminal device. Therefore, if the REDCAP terminal device still uses an existing method for determining a PDCCH candidate (candidate), an expected diversity gain cannot be obtained. Therefore, an urgent technical problem to be resolved is how to improve a diversity gain that can be obtained by a PDCCH candidate.

SUMMARY

This application provides a resource determining method and an apparatus, to increase a diversity gain that can be obtained by a PDCCH candidate.

According to a first aspect, a resource determining method is provided, including: determining index values of n first CCEs occupied by a PDCCH candidate (candidate) in a CORESET in a first control channel element (control channel element, CCE) set, and index values of m second CCEs occupied by the PDCCH candidate in the CORESET in a second CCE set, where the CORESET is divided into a first physical time-frequency resource area and a second physical time-frequency resource area, the first physical time-frequency resource area is different from the second physical time-frequency resource area in time domain and/or frequency domain, a quantity of CCEs included in the first CCE set is determined based on a quantity of resource element groups (resource element group, REG) included in the first physical time-frequency resource area, a quantity of CCEs included in the second CCE set is determined based on a quantity of REGs included in the second physical time-frequency resource area, both m and n are positive integers, and a sum of m and n is equal to an aggregation level of the PDCCH candidate; and determining a physical time-frequency resource occupied by the PDCCH candidate based on the n first CCEs and the m second CCEs.

Based on the foregoing technical solution, a CORESET is divided into a first physical time-frequency resource area and a second physical time-frequency resource area, a quantity of CCEs included in a first CCE set is determined based on a quantity of REGs included in the first physical time-frequency resource area, and a quantity of CCEs in a second CCE set is determined based on a quantity of REGs included in the second physical time-frequency resource area. In this way, $N_{cce,p}$ CCEs are divided into two CCE sets. Therefore, a communications device determines index values of n first CCEs occupied by the PDCCH candidate in the first CCE set and index values of m second CCEs occupied by the PDCCH candidate in the second CCE set. Compared with index values that are of L consecutive CCEs corresponding to the PDCCH candidate and that are determined in the conventional technology, the index values of the n first CCEs and the index values of the m second CCEs that are determined in this embodiment of this application are more discretized. Therefore, there is a high probability that a dispersion degree of the physical time-frequency resource occupied by the PDCCH candidate can be increased, and there is a high probability that a diversity gain of the PDCCH candidate can be increased.

In a possible design, the index values of the n first CCEs are consecutive, and the index values of the m second CCEs are consecutive. In this way, the communications device determines an index value of the $1^{st}$ first CCE in the n first CCEs, to determine index values of other first CCEs. The communications device determines an index value of the $1^{st}$ second CCE in the m second CCEs, to determine index values of other second CCEs.

In a possible design, n is equal to m.

In a possible design, the quantity of CCEs included in the first CCE set is the same as the quantity of CCEs included in the second CCE set.

In a possible design, a difference between a first index value and a second index value is a preset value, the first index value is an index value of a first CCE that has a smallest index value in the n first CCEs, and the second index value is an index value of a second CCE that has a smallest index value in the m second CCEs.

In a possible design, a difference between a first index value and a second index value is determined based on a preset value and an offset value, the first index value is an index value of a first CCE that has a smallest index value in the n first CCEs, and the second index value is an index value of a second CCE that has a smallest index value in the m second CCEs. In this way, the index values of the n first CCEs and the index values of the m second CCEs are more randomized, so that there is a high probability that the PDCCH candidate can obtain a large diversity gain.

In a possible design, when the first CCE set is numbered from 0, and the second CCE set is numbered from $N_{cce,p,first}$, the preset value is equal to $N_{cce,p,first}$, and $N_{cce,p,first}$ is the quantity of CCEs included in the first CCE set; or when the CCEs included in the first CCE set are numbered from 0, and the CCEs included in the first CCE set are numbered from 0, the preset value is equal to 0.

In a possible design, the determining index values of n first CCEs occupied by a PDCCH candidate in a CORESET in a first CCE set and index values of m second CCEs occupied by the PDCCH in the CORESET in a second CCE set includes: determining an index value of each of the n first CCEs according to a first formula; and determining an index value of each of the n second CCEs according to a second formula.

The first formula may be any one of the following formula (2) to formula (5). The second formula may be any one of the following formula (6) to formula (11). For specific descriptions of the formula (2) to the formula (6), refer to the following. Details are not described herein again.

According to a second aspect, a resource determining method is provided, including: determining index values of L CCEs occupied by a PDCCH candidate, where L is equal to an aggregation level of the PDCCH candidate; for each of the L CCEs, determining, based on an index value of the CCE, p input sequence numbers corresponding to the CCE, where p is a positive integer; and determining, based on a first interleaver and the p input sequence numbers corresponding to the CCE, index values of p control element group bundles REG bundles to which the CCEs are mapped, where the first interleaver is configured to output two input sequence numbers at an interval of an interleaving depth as index values of two REG bundles that are not adjacent in frequency domain.

Based on the foregoing technical solution, because a REDCAP terminal device generally uses a large aggregation level, there may be two input sequence numbers with an interval of an interleaving depth in several input sequence numbers corresponding to the L CCEs occupied by a PDCCH candidate of the REDCAP terminal device. The first interleaver provided in this embodiment of this application is configured to output two input sequence numbers at an interval of an interleaving depth as index values corresponding to two REG bundles that are not adjacent in frequency domain. Therefore, there may be at least two REG bundles that are not adjacent in frequency domain in several REG bundles occupied by the PDCCH candidate, so that a probability that the REG bundles occupied by the PDCCH candidate gather together is reduced, thereby improving a frequency diversity gain obtained by the PDCCH candidate.

In a possible design, the determining, based on a first interleaver and p input sequence numbers corresponding to the CCE, index values of p REG bundles to which the CCE is mapped includes: determining, for any one of the P input sequence numbers corresponding to the CCE, a three-dimensional number corresponding to the input sequence number, where the three-dimensional number includes a group number, a row number, and a column number; and determining, based on the three-dimensional number corresponding to the input sequence number, the index value of the REG bundle corresponding to the input sequence number. In this way, compared with an interleaving method in the conventional technology in which an input sequence number is generally mapped to a two-dimensional number (namely, a row number and a column number), in the first interleaver provided in this embodiment of this application, a dimension of number (namely, a group number) is added, so that a result of mapping the input sequence number to an index value of a REG bundle is more discrete, and a result of mapping a CCE to a REG bundle is more discrete.

In a possible design, the first interleaver may satisfy the following formula (20), formula (21), formula (22), or formula (23). For specific descriptions of the formula (20), the formula (21), the formula (22), and the formula (23), refer to the following. Details are not described herein again.

According to a third aspect, a communications apparatus is provided, including a determining unit and a mapping unit. The determining unit is configured to: determine index values of n first CCEs occupied by a PDCCH candidate candidate in a CORESET in a first CCE set, and index values of m second CCEs occupied by the PDCCH candidate in the CORESET in a second CCE set, where the CORESET is divided into a first physical time-frequency resource area and a second physical time-frequency resource area, the first physical time-frequency resource area is different from the second physical time-frequency resource area in time domain and/or frequency domain, a quantity of CCEs included in the first CCE set is determined based on a quantity of REGs included in the first physical time-frequency resource area, and a quantity of CCEs included in the second CCE set is determined based on a quantity of REGs included in the second physical time-frequency resource area, both m and n are positive integers, and a sum of m and n is equal to an aggregation level of the PDCCH candidate. The mapping unit is configured to: determine, based on the n first CCEs and the m second CCEs, a physical time-frequency resource occupied by the PDCCH candidate.

In a possible design, the index values of the n first CCEs are consecutive, and the index values of the m second CCEs are consecutive.

In a possible design, n is equal to m.

In a possible design, the quantity of CCEs included in the first CCE set is the same as the quantity of CCEs included in the second CCE set.

In a possible design, a difference between a first index value and a second index value is a preset value, the first index value is an index value of a first CCE that has a smallest index value in the n first CCEs, and the second index value is an index value of a second CCE that has a smallest index value in the m second CCEs.

In a possible design, a difference between a first index value and a second index value is determined based on a preset value and an offset value, the first index value is an index value of a first CCE that has a smallest index value in the n first CCEs, and the second index value is an index value of a second CCE that has a smallest index value in the m second CCEs.

In a possible design, when the first CCE set is numbered from 0, and the second CCE set is numbered from $N_{cce,p,first}$, the preset value is equal to $N_{cce,p,first}$, and $N_{cce,p,first}$ is the quantity of CCEs included in the first CCE set; or when the CCEs included in the first CCE set are numbered from 0, and the CCEs included in the second CCE set are numbered from 0, the preset value is equal to 0.

In a possible design, a determining unit is specifically configured to: determine an index value of each of the n first CCEs according to a first formula; and determine an index value of each of then second CCEs according to a second formula.

The first formula may be any one of the following formula (2) to formula (5). The second formula may be any one of the following formula (6) to formula (11). For specific descriptions of the formula (2) to the formula (6), refer to the following. Details are not described herein again.

According to a fourth aspect, a communications apparatus is provided, including a determining unit and a mapping unit. The determining unit is configured to: determine index values of L CCEs occupied by a PDCCH candidate, where L is equal to an aggregation level of the PDCCH candidate. The mapping unit is configured to: for each of the L CCEs, determine, based on an index value of the CCE, p input sequence numbers corresponding to the CCE, where p is a positive integer; and determine, based on a first interleaver and the p input sequence numbers corresponding to the CCE, index values of p control element group bundles REG bundles to which the CCE is mapped, where the first interleaver is configured to output index values of two REG bundles that are not adjacent in frequency domain by using two input sequence numbers at an interval of an interleaving depth.

In a possible design, the mapping unit is specifically configured to: determine, for any one of the P input sequence numbers corresponding to the CCE, a three-dimensional number corresponding to the input sequence number, where the three-dimensional number includes a group number, a row number, and a column number; and determine, based on the three-dimensional number corresponding to the input sequence number, an index value of a REG bundle corresponding to the input sequence number.

In a possible design, the first interleaver may satisfy the following formula (20), formula (21), formula (22), or formula (23). For specific descriptions of the formula (20), the formula (21), the formula (22), and the formula (23), refer to the following. Details are not described herein again.

According to a fifth aspect, a communications apparatus is provided. The communications apparatus includes a processor and a transceiver. The processor and the transceiver are configured to implement the method according to any design of the first aspect or the second aspect. The processor is configured to perform a processing action in the corresponding method, and the transceiver is configured to perform a receiving/transmitting action in the corresponding method.

According to a sixth aspect, a chip is provided. The chip includes a processing circuit and a transceiver pin, where the processing circuit and the transceiver pin are configured to implement the method according to any design in the first aspect or the second aspect. The processing circuit is configured to perform a processing action in a corresponding method, and the transceiver pin is configured to perform a receiving/transmitting action in the corresponding method.

According to a seventh aspect, a computer-readable storage medium is provided. The computer-readable storage medium stores computer instructions. When the computer instructions are run on a computer, the computer is enabled to perform the method provided in any design of the first aspect or the second aspect.

According to an eighth aspect, a computer program product is provided. When the computer instructions are run on a computer, the computer is enabled to perform the method provided in any one of the first aspect or the second aspect or the designs of the first aspect or the second aspect.

It should be noted that, for a technical effect brought by any design of the third aspect to the eighth aspect, refer to a technical effect brought by a corresponding design of the first aspect or the second aspect. Details are not described herein again.

BRIEF DESCRIPTION OF DRAWINGS

FIG. 6(a) is a schematic diagram of a CORESET of a REDCAP terminal device according to an embodiment of this application;

FIG. 6(b) is a schematic diagram of a CORESET of another REDCAP terminal device according to an embodiment of this application;

FIG. 8(a) is a schematic diagram of a PDCCH candidate of still another REDCAP terminal device in a related technology;

FIG. 8(b) is a schematic diagram of a PDCCH candidate of yet another REDCAP terminal device in a related technology;

FIG. 9(a) is a schematic diagram of a PDCCH candidate of yet still another REDCAP terminal device in a related technology;

FIG. 9(b) is a schematic diagram of a PDCCH candidate of a further REDCAP terminal device in a related technology;

FIG. 13 is a flowchart of a resource determining method according to an embodiment of this application;

FIG. 14 is a schematic diagram of a PDCCH candidate according to an embodiment of this application;

FIG. 15 is a schematic diagram of a PDCCH candidate according to an embodiment of this application;

FIG. 16 is a schematic diagram of a PDCCH candidate according to an embodiment of this application;

FIG. 17 is a schematic diagram of a PDCCH candidate according to an embodiment of this application;

FIG. 18 is a schematic diagram of a PDCCH candidate according to an embodiment of this application;

FIG. 21 is a flowchart of another resource determining method according to an embodiment of this application;

FIG. 22 is a schematic diagram of a PDCCH candidate of a REDCAP terminal device in a related technology;

FIG. 25 is a schematic diagram of a correspondence between an input sequence number and an index value of a REG bundle according to an embodiment of this application;

FIG. 26 is a schematic diagram of a correspondence between an input sequence number and an index value of a REG bundle according to an embodiment of this application;

FIG. 27 is a schematic diagram of a correspondence between an input sequence number and an index value of a REG bundle according to an embodiment of this application;

FIG. 28 is a schematic diagram of a correspondence between an input sequence number and an index value of a REG bundle according to an embodiment of this application;

FIG. 29 is a flowchart of a resource determining method according to an embodiment of this application;

DESCRIPTION OF EMBODIMENTS

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more.

In this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

The technical solutions provided in the embodiments of this application may be applied to various communications systems, for example, a new radio (new radio, NR) communications system using a 5th generation (5th generation, 5G) communication technology, a future evolved system, or a plurality of convergent communications systems. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra-reliable & low latency communication, uRLLC), and massive machine-type communications (massive machine type communication, mMTC).

Figure 1:
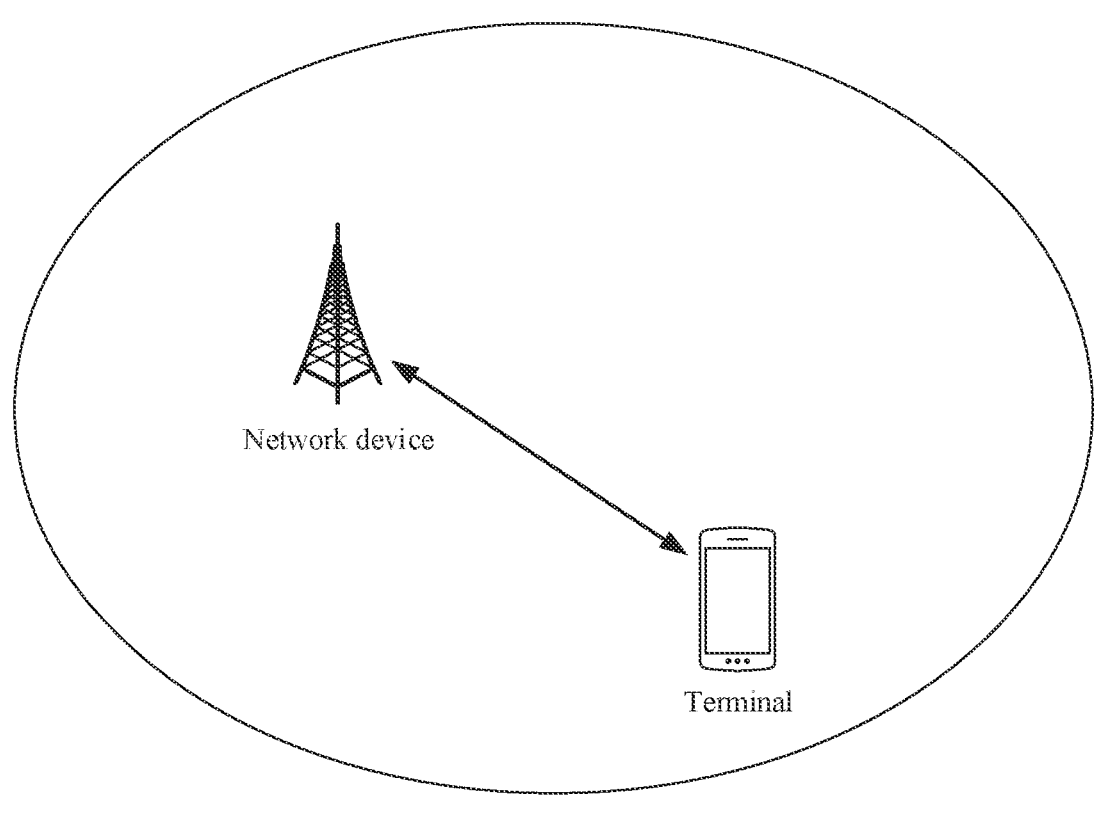
FIG. 1 is a schematic diagram of an architecture of a communications system according to an embodiment of this application.

FIG. 1 is a schematic diagram of an architecture of a communications system according to an embodiment of this application. The architecture of the communications system may include one or more network devices (only one network device is shown in FIG. 1) and one or more terminal devices connected to each network device.

The network device may be a base station, a base station controller, or the like in wireless communication. The base station may include various types of base stations, such as a micro base station (also referred to as a small cell), a macro base station, a relay station, and an access point. This is not specifically limited in embodiments of this application. In embodiments of this application, the base station may be an evolved NodeB (evolved NodeB, eNB or e-NodeB) in long term evolution (long term evolution, LTE), an eNB in the Internet of Things (internet of things, IoT) or the narrowband Internet of Things (narrow band-internet of things, NB-IoT), or a base station in a future 5G mobile communications network or a future evolved public land mobile network (public land mobile network, PLMN). This is not limited in embodiments of this application. In embodiments of this application, an apparatus configured to implement a function of the network device may be a network device, or may be an apparatus that can support the network device in implementing the function, for example, a chip system. In embodiments of this application, the technical solutions provided in embodiments of this application are described by using an example in which the apparatus configured to implement a function of a network device is the network device.

The network device described in this application, for example, the base station, usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. A distributed base station greatly shortens a length of the feeder between the RRU and the antenna, to reduce a signal loss, and reduce costs of the feeder. In addition, the RRU and the antenna are small and can be installed anywhere, making network planning more flexible. The RRU may be remotely placed. In addition to that, all BBUs may be centralized and placed in a central office (Central Office, CO). In this centralized manner, a quantity of base station equipment rooms and corresponding infrastructure can be greatly reduced, energy consumption of auxiliary devices, especially air conditioners, can be reduced, and carbon emission can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (Distributed Unit, DU). The base station may further include an active antenna unit (active antenna unit, AAU). The CU implements some functions of the base station, and the DU implements some functions of the base station. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified as a network device in a RAN, or the CU may be classified as a network device in a core network (core network, CN). This is not limited herein.

The terminal device is a device that has a wireless transceiver function. The terminal device may be deployed on land, including an indoor or outdoor device, a handheld device, or a vehicle-mounted device; or may be deployed on a water surface (for example, on a ship); or may be deployed in air (for example, on aircraft, a balloon, or a satellite). The terminal device may be user equipment (user equipment, UE). The UE includes a handheld device, a vehicle-mounted device, a wearable device, or a computing device that has a wireless communication function. For example, the UE may be a mobile phone (mobile phone), a tablet computer, or a computer having a wireless transceiver function. The terminal device may be a virtual reality (virtual reality, VR) terminal device, an augmented reality (augmented reality, AR) terminal device, a wireless terminal device in industrial control, a wireless terminal device in unmanned driving, a wireless terminal device in telemedicine, a wireless terminal device in a smart grid, a wireless terminal device in a smart city (smart city), a wireless terminal device in a smart home (smart home), or the like. In embodiments of this application, an apparatus configured to implement a function of the terminal device may be a terminal device, or may be an apparatus that can support the terminal device in implementing the function, for example, a chip system. In this embodiment of this application, the chip system may include a chip, or may include a chip and another discrete component. In the embodiments of this application, the technical solutions provided in embodiments of this application are described by using an example in which an apparatus configured to implement a function of the terminal device is the terminal device.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 2:
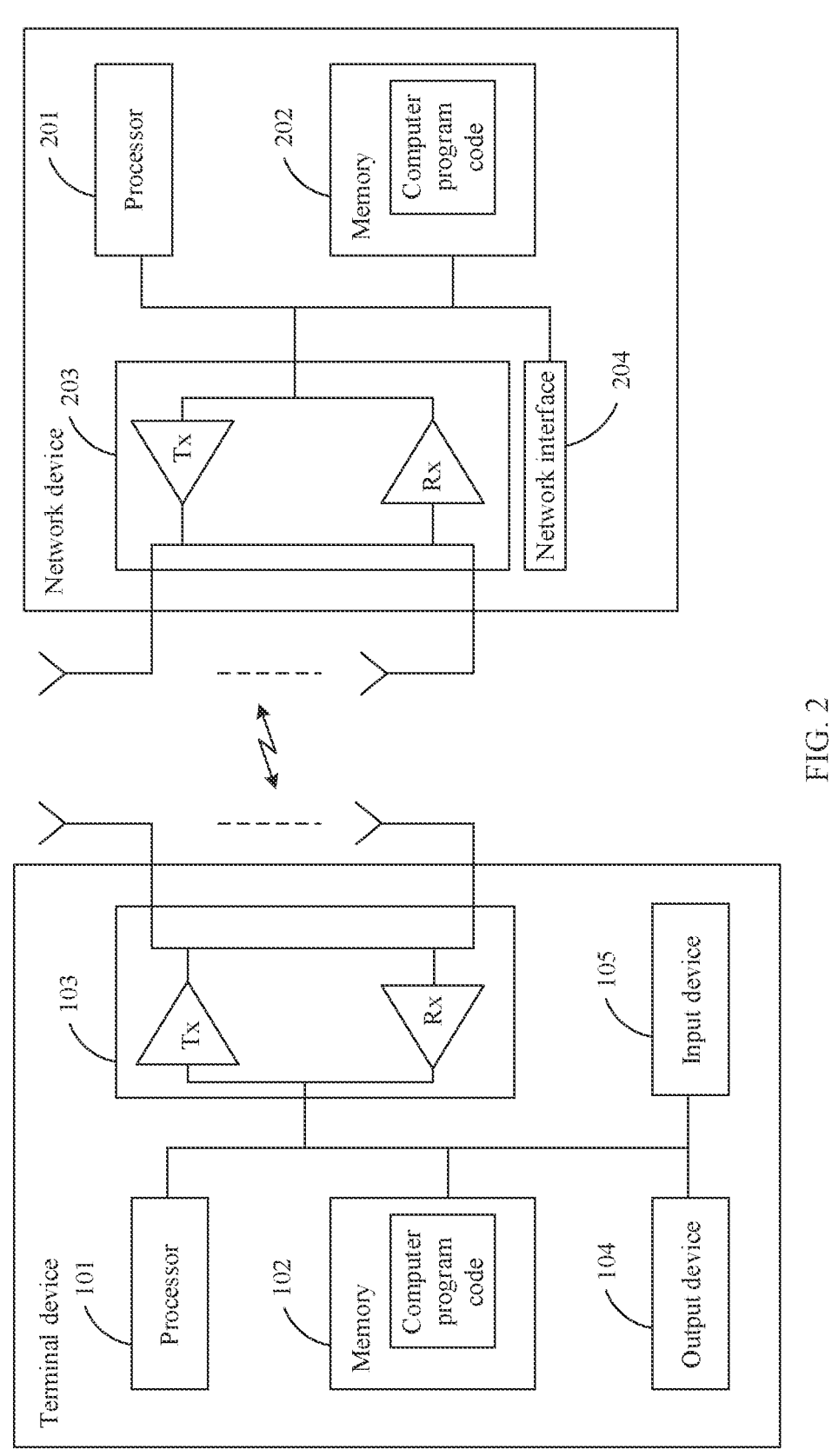
FIG. 2 is a schematic diagram of structures of a network device and a terminal device according to an embodiment of this application.

FIG. 2 is a schematic diagram of hardware structures of a network device and a terminal device according to an embodiment of this application.

The terminal device includes at least one processor 101 and at least one transceiver 103. Optionally, the terminal device may further include an output device 104, an input device 105, and at least one memory 102.

The processor 101, the memory 102, and the transceiver 103 are connected through a bus. The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in this embodiment of this application. The memory 102 may exist independently, and is connected to the processor 101 through the bus. Alternatively, the memory 102 may be integrated with the processor 101. The memory 102 is configured to store application program code for performing the solutions in this application, and the processor 101 controls the execution. The processor 101 is configured to execute the computer program code stored in the memory 102, to implement the method provided in embodiments of this application.

The transceiver 103 may use any apparatus such as a transceiver, and is configured to communicate with another device or a communications network such as the Ethernet, a radio access network (radio access network, RAN), or a wireless local area network (wireless local area network, WLAN). The transceiver 103 includes a transmitter Tx and a receiver Rx.

The output device 104 communicates with the processor 101, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, or a projector (projector). The input device 105 communicates with the processor 101, and may receive an input of a user in a plurality of manners. For example, the input device 105 may be a mouse, a keyboard, a touchscreen device, or a sensor device.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to be connected to a core network device through a link (for example, an S1 interface), or connected to a network interface of another network device through a wired or wireless link (for example, an X2 interface) (not shown in the figure). This is not specifically limited in this embodiment of this application. In addition, for related descriptions of the processor 201, the memory 202, and the transceiver 203, refer to the descriptions of the processor 101, the memory 102, and the transceiver 103 in the terminal device. Details are not described herein again.

The following first briefly describes PDCCH blind detection in a current standard.

In the current standard, a terminal device blindly detects a PDCCH in a CORESET.

One CORESET may be understood as a physical time-frequency resource, and occupies several physical resource blocks (physical resource blocks, PRB) in frequency domain, and occupies several symbols (symbols) in time domain. In the conventional technology, one CORESET occupies one to three symbols in time domain.

In one CORESET, an RB on each symbol is referred to as a REG. Several REGs form a REG bundle (bundle). A quantity of REGs that form the REG bundle may be referred to as a REG bundle size. In the conventional technology, the REG bundle size is generally 2, 3, or 6. The REG or the REG bundle is a physical time-frequency resource.

Several REG bundles may form one CCE, but one CCE fixedly includes six REGs.

The terminal device blindly detects the PDCCH in the CORESET, which is actually performing detection at several PDCCH candidates (candidate) in the CORESET. In other words, the terminal device detects, on each of the several PDCCH candidates, whether there is a PDCCH sent to the terminal device.

One PDCCH candidate occupies L consecutive CCEs. L is an aggregation level (aggregation level, AL) of the PDCCH candidate. For example, if one PDCCH candidate occupies four consecutive CCEs, it means that an aggregation level of the PDCCH candidate is 4.

Currently, the aggregation level of the PDCCH candidate may be 1, 2, 4, 8, or 16.

In the current standard, CCE index values (index) of L CCEs occupied by a PDCCH candidate numbered $m_{s,n_{CI}}$ are calculated by using the following formula (1):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\} + i \qquad (1)$$

$$i = 0, 1, \dots, L-1.$$

Specific meanings of parameters in formula (1) are as follows:

(1) For common search space (common search space set, CSS), $$Y_{p,n_{s,f}^{\mu}} = 0.$$

When the PDCCH candidate belongs to user equipment specific search space (UE specific search space set, USS), $$Y_{p,n_{s,f}^{\mu}} = \left(A_p \cdot Y_{p,n_{s,f}^{\mu}-1}\right) \bmod D, \; Y_{p,n_{s,f}^{\mu}-1} = n_{RNTI} \neq 0,$$

and $n_{RNTI}$ is a C-RNTI of the terminal device; when pmod3=0, $A_p$=39827; when pmod3=1, $A_p$=39829; when pmod3=2, $A_p$=39839; D=65537; and p is a number of the CORESET.

(2) $m_{s,n_{CI}}$ is an integer greater than or equal to 0 and less than or equal to $$M_{s,n_{CI}}^{(L)} - 1, \text{ and } M_{s,n_{CI}}^{(L)}$$

is a total quantity of candidate PPDCHs that correspond to a carrier $n_{CI}$ and whose aggregation levels are L in search space s.

(3) $N_{CCE,p}$ is a quantity of REGs included in the CORESET.

(4) For the common search space, $$M_{s,max}^{(L)} = M_{s,0}^{(L)};$$

for the user equipment specific search space, $$M_{s,max}^{(L)}$$

is equal to a maximum value of $$M_{s,n_{CI}}^{(L)}$$

corresponding to all $n_{CI}$.

(5) $n_{CI}$ is a value of a carrier indicator field, and is valid only in a USS of cross-carrier scheduling, and is equal to 0 by default in other cases.

After the terminal device determines the several CCEs occupied by the PPDCH candidate, the terminal device may determine, based on mapping from the CCE to the REG, a physical time-frequency resource actually occupied by the PPDCH candidate.

Because one REG bundle includes two, three, or six REGs, one CCE may correspond to three, two, or one REG bundle. Specifically, a CCE whose index value is j includes REG bundles whose index values are $$f\left(\frac{6j}{k}\right), f\left(\frac{6j}{k}+1\right), \dots, f\left(\frac{6j}{k}+\frac{6}{k}-1\right).$$

K is a REG bundle size.

For example, a REG bundle size is equal to 2. A CCE whose index value is 3 includes a REG bundle whose index value is f(9), a REG bundle whose index value is f(10), and a REG bundle whose index value is f(11).

There are two CCE-to-REG mapping manners: non-interleave mapping and interleave mapping. It should be understood that one CORESET can be associated with only one mapping manner.

1. Non-interleave mapping

For non-interleave mapping, a REG bundle size is equal to 6, and f(x)=x.

Figures 3, 4, 5:
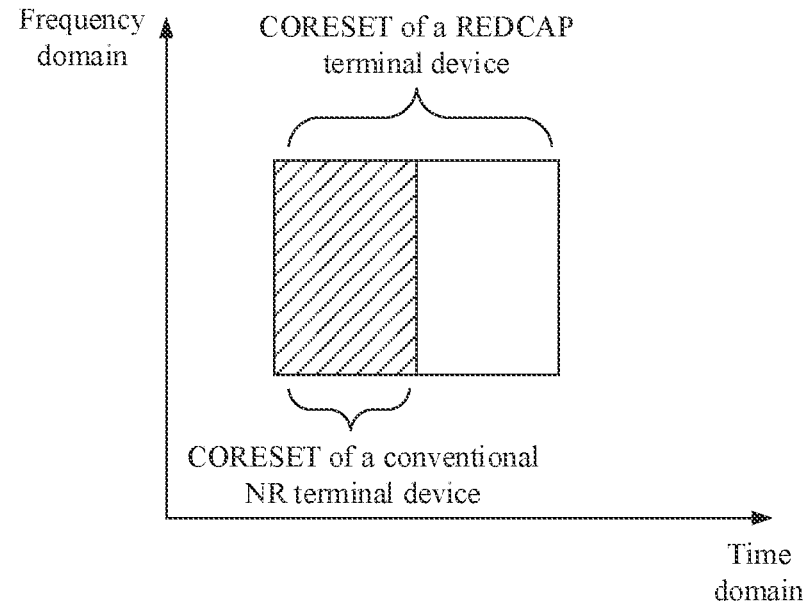
FIG. 3 is a schematic diagram of non-interleave mapping according to an embodiment of this application.
FIG. 4 is a schematic diagram of interleave mapping according to an embodiment of this application.
FIG. 5 is a schematic diagram in which a CORESET of a conventional NR terminal device overlaps a CORESET of a REDCAP terminal device.

For example, FIG. 3 is a schematic diagram of non-interleave mapping. In FIG. 3, each rectangular block represents one REG bundle, a number in a first row of the rectangular block represents an index of the REG bundle, and a number in a second row of the rectangular block represents an index of a CCE to which the REG bundle is mapped. As shown in FIG. 3, when the non-interleave mapping manner is used, a CCE whose index value is 0 is mapped to a REG bundle whose index value is 0, a CCE whose index value is 1 is mapped to a REG bundle whose index value is 1, a CCE whose index value is 2 is mapped to a REG bundle whose index value is 2, and the like. In other words, the CCE is mapped to a REG bundle whose index value is the same as that of the CCE.

2. Interleave mapping

For interleave mapping, $$f(x) = (rC + c + n_{shift}) \bmod \left( \frac{N_{REG}^{CORESET}}{K} \right).$$

$$x = cR + r$$

$$r = 0, 1, \dots, R-1$$

$$c = 0, 1, \dots, C-1$$

$$C = \frac{N_{REG}^{CORESET}}{KR}$$

It should be understood that C represents a quantity of columns in an interleaving matrix, and R represents a quantity of rows in the interleaving matrix. R may also represent an interleaving depth, and $R \in \{2,3,6\}$.

For example, FIG. 4 is a schematic diagram of interleave mapping. In FIG. 4, each rectangular block represents one REG bundle, a number in a first row of the rectangular block represents an index of the REG bundle, and a number in a second row of the rectangular block represents an index of a CCE to which the REG bundle is mapped. It is assumed that a REG bundle size is 6, a CORESET includes six REG bundles, and an interleaving depth is set to 2. As shown in FIG. 4, a CCE whose index value is 0 is mapped to a REG bundle whose index value is 0, a CCE whose index value is 1 is mapped to a REG bundle whose index value is 3, a CCE whose index value is 2 is mapped to a REG bundle whose index value is 1, a CCE whose index value is 3 is mapped to a REG bundle whose index value is 4, a CCE whose index value is 4 is mapped to a REG bundle whose index value is 2, and a CCE whose index value is 5 is mapped to a REG bundle whose index value is 5.

The foregoing is a brief description of PDCCH blind detection in the current standard. For specific details, refer to a related 3GPP standard.

To support features such as a high data rate, a low latency, and high reliability of the 5G NR system, an NR terminal device has a strong capability. For example, on a common commercial frequency band, an NR terminal device needs to support 4-antenna reception, 100 MHz system bandwidth, and the like. However, these requirements cause high hardware costs of the NR terminal device. To further expand the NR market and reduce hardware costs of terminal devices, 3GPP has initiated a reduced capability (reduced capability, REDCAP) topic, expecting to reduce complexity and costs of terminal devices by reducing a quantity of antennas or the like.

In the following, a terminal device involved in the RED-CAP subject is referred to as a REDCAP terminal device, and a terminal that does not support various capabilities studied in the REDCAP subject is referred to as a conventional NR terminal device.

For a REDCAP terminal device, as a quantity of receive antennas of the terminal device decreases, a coverage area of a downlink signal decreases. To improve coverage of a PDCCH, in one manner, a quantity of symbols occupied by a CORESET is increased. For example, a quantity of symbols supported by the REDCAP terminal device may be increased to more than three.

When both a conventional NR terminal device (for example, an eMBB terminal device) and a REDCAP terminal device exist in a communications system, a CORESET of the conventional NR terminal device may overlap a CORESET of the REDCAP terminal device. For example, as shown in FIG. 5, a physical time-frequency resource occupied by a CORESET of a conventional NR terminal device is a rectangular block filled with a shadow in FIG. 5. A physical time-frequency resource occupied by a CORE-SET of a REDCAP terminal device includes a rectangular block filled with a shadow in FIG. 5 and a blank rectangular block in FIG. 5.

When the CORESET of the conventional NR terminal device overlaps the CORESET of the REDCAP terminal device, for an overlapping physical time-frequency resource, if a part of the physical time-frequency resource is used to send a PDCCH to the REDCAP terminal device, the part of the physical time-frequency resource cannot be provided to the conventional NR terminal device for use. Alternatively, if some physical time-frequency resources are used to send a PDCCH to the conventional NR terminal device, the physical time-frequency resources cannot be provided to the REDCAP terminal device for use. This phenomenon can be called blocking (blocking).

To enable better compatibility between the REDCAP terminal device and the conventional NR terminal device, and reduce a blocking probability between the REDCAP terminal device and the conventional NR terminal device as much as possible, a frequency domain width of the CORE-SET of the REDCAP terminal device should be the same as that of the CORESET of the conventional NR terminal device, and in an overlapping part between the CORESET of the REDCAP terminal device and the CORESET of the conventional NR terminal device, REG bundle sorting needs to be consistent with a manner in the conventional technology as much as possible.

For example, as shown in FIG. 6(a), an example in which a REG bundle size is 6 is used. REG bundles in a CORESET of a REDCAP terminal device are numbered in frequency domain first and then in time domain. Therefore, a REG bundle whose index value is 0 to a REG bundle whose index value is 23 may be arranged in a manner in FIG. 6(a).

For example, as shown in FIG. 6(b), an example in which a REG bundle size is 3 is used. REG bundles in a CORESET of a REDCAP terminal device are numbered in frequency domain first and then in time domain. Therefore, a REG bundle Whose index value is 0 to a REG bundle whose index value is 47 may be arranged in a manner in FIG. 6(b).

For ease of description, the CORESET of the REDCAP terminal device is divided into an area 1 and an area 2 below. The area 1 is a part that overlaps a CORESET of a conventional NR terminal device, and the area 2 is a part that does not overlap the CORESET of the conventional NR terminal device.

A method for determining a PDCCH candidate in the conventional technology is not applicable to a REDCAP terminal device. A reason is as follows:

(1) If CCE-to-REG mapping is performed in a non-interleave mapping manner, and the REDCAP terminal device uses a method for determining a PDCCH candidate the same as that of the conventional NR terminal device, when a PDCCH candidate of the REDCAP terminal device overlaps (overlap) a PDCCH candidate of the conventional NR terminal device, a large physical time-frequency resource is blocked, and the PDCCH candidate of the REDCAP terminal device does not obtain a time diversity gain.

For example, as shown in FIG. 7(*a*), a REG bundle size in the CORESET is 6. The CORESET of the REDCAP terminal device includes REG bundles whose index values are 0 to 23, and the CORESET of the conventional NR terminal device includes REG bundles whose index values are 0 to 11. It is assumed that the PDCCH candidate of the REDCAP terminal device occupies a CCE 0 to a CCE 7. In a case in which a non-interleave mapping manner is used, the PDCCH candidate occupies REG bundles whose index values are 0 to 7. In this way, eight REG bundles in the CORESET of the conventional NR terminal device are blocked, which affects the conventional NR terminal device in using a physical time-frequency resource in the CORE-SET configured by the conventional NR terminal device. In addition, the REG bundles whose index values are 0 to 7 are concentrated on the first three symbols. Therefore, the PDCCH candidate of the REDCAP terminal device cannot obtain a time diversity gain.

For example, as shown in FIG. 7(*b*), the REG bundle size in the CORESET is 3. The CORESET of the REDCAP terminal device includes REG bundles whose index values are 0 to 47, and the CORESET of the conventional NR terminal device includes REG bundles whose index values are 0 to 23. It is assumed that the PDCCH candidate of the REDCAP terminal device occupies a CCE 0 to a CCE 7. In a case in which a non-interleave mapping manner is used, the PDCCH candidate occupies REG bundles whose index values are 0 to 15. In this way, sixteen REG bundles in the CORESET of the conventional NR terminal device are blocked, which affects the conventional NR terminal device in using a physical time-frequency resource in the CORE-SET configured by the conventional NR terminal device. In addition, the REG bundles whose index values are 0 to 15 are concentrated on the first three symbols. Therefore, the PDCCH candidate of the REDCAP terminal device cannot obtain a time diversity gain.

(2) if CCE-to-REG mapping is performed in an interleave mapping manner, the area 1 and the area 2 in the CORESET of the REDCAP terminal device are jointly mapped, and the REDCAP terminal device determines, by using the forego-ing formula (1), L consecutive CCEs occupied by the PDCCH candidate, the PDCCH candidate of the REDCAP terminal device cannot obtain an expected frequency diver-sity gain.

For example, as shown in FIG. 8(*a*), a REG bundle size in the CORESET is 6. The CORESET of the REDCAP terminal device includes REG bundles whose index values are 0 to 23, where the area 1 includes REG bundles whose index values are 0 to 11, and the area 2 includes REG bundles whose index values are 12 to 23. The CORESET of the conventional NR terminal device includes REG bundles whose index values are 0 to 11. It is assumed that the PDCCH candidate of the REDCAP terminal device occupies a CCE 0 to a CCE 7. When joint interleave mapping is performed in the area 1 and the area 2 of the CORESET of the REDCAP terminal device, and an interleaving depth is 2, the CCE 0 is mapped to the REG bundle whose index value is 0, the CCE 1 is mapped to the REG bundle whose index value is 12, the CCE 2 is mapped to the REG bundle whose index value is 1, the CCE 3 is mapped to the REG bundle whose index value is 13, the CCE 4 is mapped to the REG bundle whose index value is 2, and the CCE 5 is mapped to the REG bundle whose index value is 14, the CCE 6 is mapped to the REG bundle whose index value is 3, and the CCE 7 is mapped to the REG bundle whose index value is 15. It can be learned from FIG. 8(*a*) that the PDCCH candidate occupies REG bundles whose index values are 0 to 3 and REG bundles whose index values are 12 to 15. The REG bundles whose index values are 0 to 3 and the REG bundles whose index values are 12 to 15 occupy a same frequency domain resource. Therefore, the PDCCH candi-date cannot obtain an expected frequency diversity gain.

For example, as shown in FIG. 8(*b*), the REG bundle size in the CORESET is 3. The CORESET of the REDCAP terminal device includes REG bundles whose index values are 0 to 47. The area 1 includes REG bundles whose index values are 0 to 23, and the area 2 includes REG bundles whose index values are 24 to 47. The CORESET of the conventional NR terminal device includes REG bundles whose index values are 0 to 23. It is assumed that the PDCCH candidate of the REDCAP terminal device occupies a CCE 0 to a CCE 7. When joint interleave mapping is used in the area 1 and the area 2 of the CORESET of the REDCAP terminal device, and an interleaving depth is 2, the CCE 0 is mapped to the REG bundles whose index values are 0 and 24, the CCE 1 is mapped to the REG bundles whose index values are 1 and 25, the CCE 2 is mapped to the REG bundles whose index values are 2 and 26, the CCE 3 is mapped to the REG bundles whose index values are 3 and 27, the CCE 4 is mapped to the REG bundles whose index values are 4 and 28, the CCE 5 is mapped to the REG bundles whose index values are 5 and 29, the CCE 6 is mapped to the REG bundles whose index values are 6 and 30, and the CCE 7 is mapped to the REG bundles whose index values are 7 and 31. It can be learned from FIG. 8(*b*) that the PDCCH candidate occupies the REG bundles whose index values are 0 to 7 and the REG bundles whose index values are 24 to 31. The REG bundles whose index values are 0 to 7 and the REG bundles whose index values are 24 to 31 occupy a same frequency domain resource. Therefore, the PDCCH candidate cannot obtain an expected frequency diversity gain.

(3) If CCE-to-REG mapping is performed in an interleave mapping manner, the area 1 and the area 2 in the CORESET of the REDCAP terminal device are separately mapped, and the REDCAP terminal device determines, by using the foregoing formula (1), L consecutive CCEs occupied by the PDCCH candidate, the PDCCH candidate of the REDCAP terminal device cannot obtain a time diversity gain, and the PDCCH candidate of the REDCAP terminal device causes a large blocking area for the CORESET of the conventional NR terminal device.

For example, as shown in FIG. 9(*a*), a REG bundle size in the CORESET is 6. The CORESET of the REDCAP terminal device includes REG bundles whose index values are 0 to 23, where the area 1 includes REG bundles whose index values are 0 to 11, and the area 2 includes REG bundles whose index values are 12 to 23. The CORESET of the conventional NR terminal device includes REG bundles whose index values are 0 to 11. It is assumed that the PDCCH candidate of the REDCAP terminal device occupies a CCE 0 to a CCE 7. When interleave mapping is separately performed in the area 1 and the area 2 of the CORESET of the REDCAP terminal device, and an interleaving depth is 2, the CCE 0 is mapped to the REG bundle whose index value is 0, the CCE 1 is mapped to the REG bundle whose index value is 6, the CCE 2 is mapped to the REG bundle whose index value is 1, the CCE 3 is mapped to the REG bundle whose index value is 7, the CCE 4 is mapped to the REG bundle whose index value is 2, the CCE 5 is mapped to the REG bundle whose index value is 8, the CCE 6 is mapped to the REG bundle whose index value is 3, and the CCE 7 is mapped to the REG bundle whose index value is 9. In this way, eight REG bundles in the CORESET of the conventional NR terminal device are blocked, which affects the conventional NR terminal device in using a physical time-frequency resource in the CORESET configured by the conventional NR terminal device. In addition, all of the REG bundles whose index values are 0 to 3 and the REG bundles whose index values are 6 to 9 are located on the first three symbols. Therefore, the PDCCH candidate of the REDCAP terminal device cannot obtain a time diversity gain.

For example, as shown in FIG. 9(b), the REG bundle size in the CORESET is 3. The CORESET of the REDCAP terminal device includes REG bundles whose index values are 0 to 47. The area 1 includes REG bundles whose index values are 0 to 23, and the area 2 includes REG bundles whose index values are 24 to 47. The CORESET of the conventional NR terminal device includes REG bundles whose index values are 0 to 23. It is assumed that the PDCCH candidate of the REDCAP terminal device occupies a CCE 0 to a CCE 7. When interleave mapping is separately used in the area 1 and the area 2 of the CORESET of the REDCAP terminal device, and an interleaving depth is 2, the CCE 0 is mapped to the REG bundles whose index values are 0 and 12, the CCE 1 is mapped to the REG bundles whose index values are 1 and 13, the CCE 2 is mapped to the REG bundles whose index values are 2 and 14, the CCE 3 is mapped to the REG bundles whose index values are 3 and 15, the CCE 4 is mapped to the REG bundles whose index values are 4 and 16, the CCE 5 is mapped to the REG bundles whose index values are 5 and 17, the CCE 6 is mapped to the REG bundles whose index values are 6 and 18, and the CCE 7 is mapped to the REG bundles whose index values are 7 and 19. In this way, sixteen REG bundles in the CORESET of the conventional NR terminal device are blocked, which affects the conventional NR terminal device in using a physical time-frequency resource in the CORE-SET configured by the conventional NR terminal device. In addition, all of the REG bundles whose index values are 0 to 7 and the REG bundles whose index values are 12 to 19 are located on the first three symbols. Therefore, the PDCCH candidate of the REDCAP terminal device cannot obtain a time diversity gain.

It can be learned that, for the REDCAP terminal device, if the communications system still uses the method for determining a PDCCH candidate in the conventional technology, the determined PDCCH candidate cannot obtain an expected diversity gain.

Figure 10:
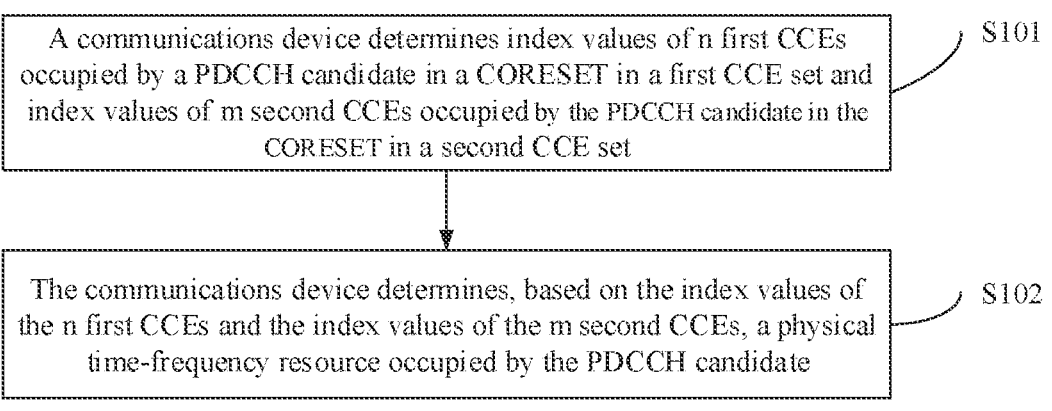
FIG. 10 is a flowchart of a resource determining method according to an embodiment of this application.

To resolve the foregoing technical problem, an embodiment of this application provides a resource determining method. As shown in FIG. 10, the method includes the following steps.

S101: A communications device determines index values of n first CCEs occupied by a PDCCH candidate in a CORESET in a first CCE set and index values of m second CCEs occupied by the PDCCH candidate in the CORESET in a second CCE set.

The communications device may be a network device or a terminal device. This is not limited herein.

In this embodiment of this application, the CORESET may be divided into a first physical time-frequency resource area and a second physical time-frequency resource area. The first physical time-frequency resource area and the second physical time-frequency resource area are different in at least one of time domain or frequency domain. Optionally, the physical time-frequency resource may be a REG or a REG bundle.

For example, with reference to FIG. 6(a), the CORESET may be divided into the first physical time-frequency resource area and the second physical time-frequency resource area based on time domain, so that the first physical time-frequency resource area may include REG bundles whose index values are 0 to 11, and the second physical time-frequency resource area may include REG bundles whose index values are 12 to 23.

For example, with reference to FIG. 6(a), the CORESET may be divided into the first physical time-frequency resource area and the second physical time-frequency resource area based on frequency domain, so that the first physical time-frequency resource area may include REG bundles whose index values are 0 to 5 and 12 to 17, and the second physical time-frequency resource area may include REG bundles whose index values are 6 to 11 and 18 to 23.

The REG bundles in the CORESET may be numbered in the following manner:

Numbering manner 1-1: REG bundles in the first physical time-frequency resource area are numbered from 0, and REG bundles in the second physical time-frequency resource area are numbered from $$\frac{N_{REG,1}^{CORESET}}{K}.$$

$$N_{REG,1}^{CORESET}$$

is a quantity of REGs included in the first physical time-frequency resource area. K is equal to the REG bundle size.

Figure 11:
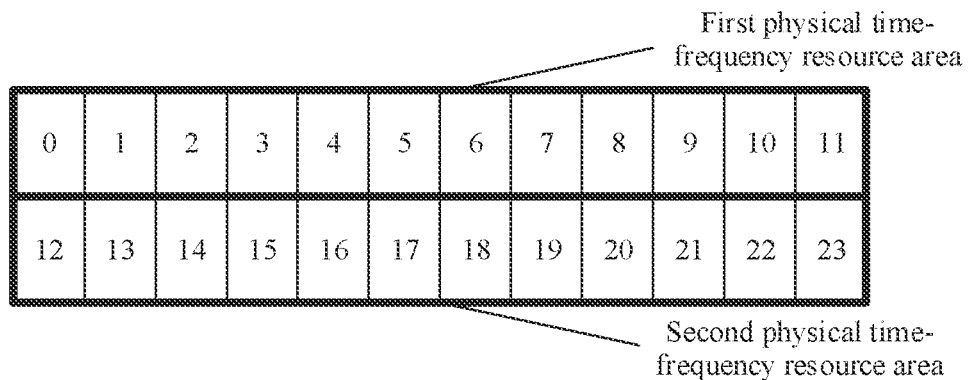
FIG. 11 is a schematic diagram of a CORESET according to an embodiment of this application.

FIG. 11 is used as an example. Index values of the REG bundles included in the first physical time-frequency resource area are sequentially 0, 1, 2, 3, 4, 5, 6, 7, 8, 9, 10, and 11. Index values of the REG bundles included in the second physical time-frequency resource area are sequentially 12, 13, 14, 15, 16, 17, 18, 19, 20, 21, 22, and 23.

Numbering manner 1-2: REG bundles in the first physical time-frequency resource area are numbered from 0, and REG bundles in the second physical time-frequency resource area are numbered from 0.

Figure 12:
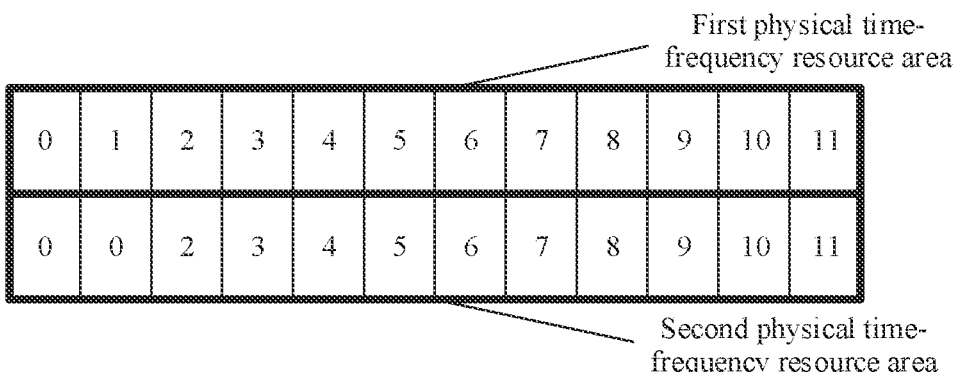
FIG. 12 is a schematic diagram of another CORESET according to an embodiment of this application.

FIG. 12 is used as an example. Index values of the REG bundles included in the first physical time-frequency resource area are sequentially 0, 1, 2, 3, 4, 5, 6, 7, 8, 9, 10, and 11. Index values of the REG bundles included in the second physical time-frequency resource area are sequentially 0, 1, 2, 3, 4, 5, 6, 7, 8, 9, 10, and 11.

In this embodiment of this application, a quantity of CCEs included in the first CCE set is determined based on a quantity of REGs included in the first physical time-frequency resource area. A quantity of CCEs included in the second CCE set is determined based on a quantity of REGs included in the second physical time-frequency resource area.

For example, it is assumed that the first physical time-frequency resource area includes 36 REGs. If one CCE occupies six REGs, it may be determined that the first CCE set includes six CCEs.

Optionally, if a quantity of REGs included in the first physical time-frequency resource area is different from a quantity of REGs included in the second physical time-frequency resource area, the quantity of CCEs included in the first CCE set is different from the quantity of CCEs included in the second CCE set.

Optionally, if a quantity of REGs included in the first physical time-frequency resource area is the same as a quantity of REGs included in the second physical time-frequency resource area, the quantity of CCEs included in the first CCE set is the same as the quantity of CCEs included in the second CCE set. In this case, the first CCE set includes $N_{CCE,p}/2$ CCEs, and the second CCE set includes $N_{CCE,p}/2$ CCEs, where $N_{CCE,p}$ is a positive integer multiple of 2. $N_{CCE,p}$ is a quantity of CCEs included in the CORESET.

In this embodiment of this application, a CCE numbering manner may be any one of the following:

Numbering manner 2-1: The CCEs in the first CCE set are numbered from 0, and the CCEs in the second CCE set are numbered from $N_{cce,p,first}$. $N_{cce,p,first}$ is the quantity of CCEs included in the first CCE set.

The numbering manner 2-1 is equivalent to joint numbering of the first CCE set and the second CCE set.

For example, the first CCE set includes six CCEs, and the second CCE set includes six CCEs. Based on the foregoing numbering manner 2-1, numbers of the CCEs in the first CCE set are sequentially 0, 1, 2, 3, 4, and 5. In addition, numbers of the CCEs in the second CCE set are sequentially 6, 7, 8, 9, 10, and 11.

Numbering manner 2-2: The CCEs in the first CCE set are numbered from 0, and the CCEs in the second CCE set are numbered from 0.

The numbering manner 2-2 is equivalent to separate numbering of the first CCE set and the second CCE set.

For example, the first CCE set includes six CCEs, and the second CCE set includes six CCEs. Based on the foregoing numbering manner 2-2, numbers of CCEs in the first CCE set are sequentially 0, 1, 2, 3, 4, and 5. In addition, numbers of the CCEs in the second CCE set are sequentially 0, 1, 2, 3, 4, and 5.

It should be understood that a specific numbering manner used by the communications device may be determined based on a factory configuration, or determined based on an indication of another device, or determined based on a configuration of the communications device. The factory configuration of the communications device is defined by a communications standard.

In a possible implementation of step S101, the communications device may determine, according to a preset formula, the index values of the n first CCEs occupied by the PDCCH candidate in the first CCE set and the index values of the m second CCEs occupied by the PDCCH candidate in the second CCE set. For a specific description of the preset formula, refer to the following. Details are not described herein.

In this embodiment of this application, both n and m are positive integers. In addition, n+m=L, and L is an aggregation level of the PDCCH candidate. A value relationship between n and m is not limited in this embodiment of this application. For example, n=m=L/2, or n is not equal to m.

It should be noted that, for each aggregation level, specific values of n and m may be determined based on a factory configuration of the communications device, or determined based on an indication of another device, or determined based on a configuration of the communications device. The factory configuration of the communications device is defined by a communications standard.

It should be understood that the index values of the n first CCEs are consecutive, and the index values of the m second CCEs are consecutive. In this case, the communications device determines an index value of the $1^{st}$ first CCE in the n first CCEs, to determine index values of other first CCEs in the n first CCEs. The communications device determines an index value of the $1^{st}$ second CCE in the m second CCEs, to determine index values of other second CCEs in the m second CCEs.

The $1^{st}$ first CCE in the n first CCEs is a first CCE with a smallest index value in the n first CCEs. The $1^{st}$ second CCE in the in second CCEs is a second CCE with a smallest index value in the m second CCEs.

For example, it is assumed that the aggregation level of the PDCCH candidate is 8, n=4, and m=4. Numbers of the CCEs in the first CCE set are sequentially 0, 1, 2, 3, 4, and 5. Numbers of the CCEs in the second CCE set are sequentially 6, 7, 8, 9, 10, and 11. When the communications device determines that the index value of the $1^{st}$ first CCE that is in the first CCE set and that is occupied by the PDCCH candidate is 1, the communications device may determine that the index values of the four first CCEs in the first CCE set occupied by the PDCCH candidate are respectively 1, 2, 3, and 4. When the communications device determines that the index value of the $1^{st}$ second CCE that is in the second CCE set and that is occupied by the PDCCH candidate is 7, the communications device may determine that index values of the four second CCEs in the second CCE set occupied by the PDCCH candidate are respectively 7, 8, 9, and 10.

For ease of description, the index value of the $1^{st}$ first CCE in the n first CCEs is referred to as a first index value for short below, and the index value of the $1^{st}$ second CCE in the m second CCEs is referred to as a second index value for short below.

Optionally, the first index value and the second index value may meet any one of the following rules:

Rule 1: A difference between the first index value and the second index value is a preset value.

In this way, the second index value may be determined based on the first index value and the preset value. For example, it is assumed that the preset value is 6. When the communications device determines that the first index value is 1, the communications device may determine that the second index value is 7.

Rule 2: A difference between the first index value and the second index value is determined based on a preset value and an offset value.

In this way, the second index value may be determined based on the first index value, the preset value, and the offset value.

In this embodiment of this application, when the numbering manner of the CCEs in the CORESET is the numbering manner 2-1, the preset value is the quantity of CCEs included in the first CCE set. Alternatively, when the numbering manner of the CCEs in the CORESET is the numbering manner 2-2, the preset value is 0.

Optionally, the offset value may be a fixed value or a random value. For example, the offset value may be determined based on a function in which time is a variable. The function in which time is a variable may be a function in which a slot index value (slot index) or a symbol index value (symbol index) is a variable.

It should be understood that, compared with the rule 1, the rule 2 may make a relationship between the index values of the n first CCEs and the index values of the m second CCEs more randomized, so that there is a probability that a degree of dispersion between a physical time-frequency resource to which the n first CCEs are mapped and a physical time-frequency resource to which the m second CCEs are mapped is increased, and in this way the PDCCH candidate has a probability of obtaining a higher diversity gain.

S102: The communications device determines, based on the index values of the n first CCEs and the index values of the m second CCEs, a physical time-frequency resource occupied by the PDCCH candidate.

In a possible implementation, the communications device determines index values of n*K first REG bundles based on the index values of the n first CCEs and a preset mapping manner. The communications device determines index values of m*K second REG bundles based on the index values of the m second CCEs and the preset mapping manner. Further, the communications device determines, based on the index values of the n*K first REG bundles and the index values of the m*K second REG bundles, the physical time-frequency resource occupied by the PDCCH candidate. K is the REG bundle size configured for the CORESET.

It should be understood that one CCE may be mapped to K REG bundles.

In this embodiment of this application, the preset mapping manner is determined by the configuration information of the CORESET. It should be understood that one CORESET is associated with only one mapping manner.

Optionally, when the foregoing numbering manner 2-1 is used as the numbering manner of the CCEs, the preset mapping manner may be a non-interleave mapping manner, a first interleave mapping manner, or a second interleave mapping manner.

Optionally, when the foregoing numbering manner 2-2 is used as the numbering manner of the CCEs, the preset mapping manner may be a non-interleave mapping manner or a second interleave mapping manner.

The non-interleave mapping manner is used to map the CCEs in the first CCE set to the first physical time-frequency resource area in a non-interleaved manner, and map the CCEs in the second CCE set to the second physical time-frequency resource area in a non-interleaved manner. In this way, in the first physical time-frequency resource area, adjacently numbered CCEs are mapped to adjacent REG bundles; and in the second physical time-frequency resource area, adjacently numbered CCEs are mapped to adjacent REG bundles.

The first interleave mapping manner is used to map, in an interleaved manner, the CCEs included in the first CCE set and the CCEs included in the second CCE set to a physical time-frequency resource occupied by the CORESET. In this case, the CCEs in the first CCE set are mapped to both the first physical time-frequency resource area and the second physical time-frequency resource area, and the CCEs in the second CCE set are mapped to both the first physical time-frequency resource area and the second physical time-frequency resource area.

The second interleave mapping manner is used to map the CCEs included in the first CCE set to the first physical time-frequency resource area, and map the second CCEs to the second physical time-frequency resource area in an interleaved manner. In this way, in the first physical time-frequency resource area, adjacently numbered CCEs are mapped to non-adjacent REG bundles; and in the second physical time-frequency resource area, adjacently numbered CCEs are mapped to non-adjacent REG bundles.

It should be understood that when the preset mapping manner used by the communications device is the non-interleave mapping manner or the second interleave mapping manner, the physical time-frequency resource to which the CCEs in the first CCE set are mapped is located in the first physical time-frequency resource area, and the physical time-frequency resource to which the CCE sets in the second CCE set are mapped is located in the second physical time-frequency resource area.

In the conventional technology, a PDCCH candidate occupies L consecutive CCEs, and there is a high probability that physical time-frequency resources obtained after the L consecutive CCEs are mapped gather together. For example, in FIG. 7(a), REG bundles 0 to 7 to which the CCEs 0 to 7 are mapped are located at a same time domain position. Consequently, the PDCCH candidate cannot obtain a good diversity gain, and a CORESET of a conventional NR terminal device may be greatly blocked.

Based on the embodiment shown in FIG. 10, a CORESET is divided into a first physical time-frequency resource area and a second physical time-frequency resource area, a quantity of CCEs included in a first CCE set is determined based on a quantity of REGs included in the first physical time-frequency resource area, and a quantity of CCEs in the second CCE set is determined based on a quantity of REGs included in the second physical time-frequency resource area. In this way, $N_{cce,p}$ CCEs are divided into two CCE sets. Therefore, the communications device determines index values of n first CCEs occupied by the PDCCH candidate in the first CCE set and index values of m second CCEs occupied by the PDCCH candidate in the second CCE set. Compared with index values that are of L consecutive CCEs corresponding to the PDCCH candidate and that are determined in the conventional technology, the index values of the n first CCEs and the index values of the m second CCEs that are determined in this embodiment of this application are more discretized. Therefore, there is a high probability that a dispersion degree of the physical time-frequency resource occupied by the PDCCH candidate can be increased, and there is a high probability that a diversity gain of the PDCCH candidate can be increased.

Further, when the communications device uses the non-interleave mapping manner or the second interleave mapping manner, the physical time-frequency resource to which the n first CCEs are mapped is located in the first physical time-frequency resource area, and the physical time-frequency resource to which the m CCEs are mapped is located in the second physical time-frequency resource area, and the first physical time-frequency resource area is different from the second physical time-frequency resource area in time domain and/or frequency domain. This also means that the physical time-frequency resources occupied by the PDCCH candidate do not gather at a same time domain position or frequency domain position, to improve a diversity gain of the PDCCH candidate.

Optionally, as shown in FIG. 13, step S101 may be specifically implemented as steps S1011 and S1012.

S1011: The communications device determines, according to a first formula, an index value of each first CCE of the n first CCEs occupied by the PDCCH candidate.

In a possible design, if a relationship between the first index value and the second index value meets the rule 1, and the numbering manner 2-1 is used as the numbering manner of the CCEs, the first formula may be as shown in the following formula (2):

$$\frac{L}{2} \cdot \left\{ \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right) \right\} + i \qquad (2)$$

$$i = 0, 1, \ldots, n-1$$

It should be understood that the index value of the 1st first CCE in the n first CCEs may be determined by substituting i=0 into the first formula, and the index value of the 2nd first CCE in the n first CCEs may be determined by substituting i=1 into the first formula. The rest may be deduced by analogy. Details are not described again.

In another possible design, if the relationship between the first index value and the second index value meets the rule 1, and the numbering manner 2-2 is used as the numbering manner of the CCEs, the first formula may be as shown in the following formula (3):

$$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p,first}}{L/2} \right\rfloor \right\} + i \tag{3}$$

$$i = 0, 1, \dots, n-1$$

In another possible design, if the relationship between the first index value and the second index value meets the rule 2, and the numbering manner 2-1 is used as the numbering manner of the CCEs, the first formula may use the foregoing formula (2), or the first formula may be as shown in the following formula (4):

$$\left\{ \frac{L}{2} \cdot \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right) + i + O_{symbol} \right\} \tag{4}$$

$$\bmod N_{CCE,p,first}$$

$$i = 0, 1, \dots, n-1$$

$O_{symbol}$ is the offset value. Optionally, $O_{symbol}$ is determined based on a function in which a symbol index value (symbol index) is a variable. Unified descriptions are provided herein and details are not described below again.

Optionally, for the first formula, $O_{symbol}$ may be determined based on a symbol occupied by the first physical time-frequency resource area in the CORESET.

In another possible design, if the relationship between the first index value and the second index value meets the rule 2, and the numbering manner 2-2 is used as the numbering manner of the CCEs, the first formula may use the foregoing formula (3), or the first formula may be as shown in the following formula (5):

$$\left\{ \frac{L}{2} \cdot \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p,first}}{L/2} \right\rfloor \right) + i + O_{symbol} \right\} \tag{5}$$

$$\bmod N_{CCE,p,first}$$

$$i = 0, 1, \dots, n-1$$

S1012: The communications device determines, according to a second formula, an index value of each second CCE of the m second CCEs occupied by the PDCCH candidate.

In a possible design, if the relationship between the first index value and the second index value meets the rule 1, and the numbering manner 2-1 is used as the numbering manner of the CCEs, the second formula may be as shown in the following formula (6):

$$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\} + i + N_{CCE,p,first} \tag{6}$$

$$i = 0, 1, \dots, m-1$$

Optionally, the formula (6) may be transformed into the following formula (7):

$$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\} + i \tag{7}$$

$$i = N_{CCE,p,first}, N_{CCE,p,first} + 1, \dots, N_{CCE,p,first} + m - 1$$

In another possible design, if the relationship between the first index value and the second index value meets the rule 1, and the numbering manner 2-2 is used as the numbering manner of the CCEs, the second formula may be as shown in the following formula (8):

$$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p,second}}{L/2} \right\rfloor \right\} + j \tag{8}$$

$$j = 0, 1, \dots, m-1$$

In another possible design, if the relationship between the first index value and the second index value meets the rule 2, and the numbering manner 2-1 is used as the numbering manner of the CCEs, the second formula may be as shown in the following formula (9):

$$\left\{ \frac{L}{2} \cdot \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right) + i + N_{CCE,p,first} + O \right\} \bmod N_{CCE,p,second} \tag{9}$$

$$i = 0, 1, \dots, m-1$$

O may be a preset fixed value. Alternatively, O may be replaced with $O_{symbol}$. Optionally, $O_{symbol}$ is determined based on a function in which a symbol index value (symbol index) is a variable. Unified descriptions are provided herein and details are not described below again.

Optionally, the formula (9) may be transformed into formula (10). The formula (10) may be as follows:

$$\left\{ \frac{L}{2} \cdot \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right) + i + O \right\} \tag{10}$$

$$\bmod N_{CCE,p,second}$$

$$i = N_{CCE,p,first}, N_{CCE,p,first} + 1, \dots, N_{CCE,p,first} + m - 1$$

In another possible design, if the relationship between the first index value and the second index value meets the rule 2, and the numbering manner 2-2 is used as the numbering manner of the CCEs, the second formula may be as shown in the following formula (11):

$$\left\{ \frac{L}{2} \cdot \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right) + i + O \right\} \tag{11}$$

-continued $$\mathrm{mod}\, N_{CCE,p,second}$$

$$i = 0,1, \ldots , m-1$$

Based on the embodiment shown in FIG. 13, the communications device may accurately determine the index values of the n first CCEs occupied by the PDCCH candidate and the index values of the m second CCEs occupied by the PDCCH candidate.

The following briefly describes, with reference to a numbering manner of the REG bundle and a numbering manner of the CCE, a mapping manner used by the communications device.

1. Non-interleave mapping manner

The non-interleave mapping manner is applicable to the following three cases:

Case 1: The REG bundles are numbered in the numbering manner 1-1, and the CCEs are numbered in the numbering manner 2-1.

Case 2: The REG bundles are numbered in the numbering manner 1-2, and the CCEs are numbered in the numbering manner 2-2.

Case 3: The REG bundles are numbered in the numbering manner 1-1, and the CCEs are numbered in the numbering manner 2-2.

Optionally, for the case 1 and the case 2, the non-interleave mapping manner may be implemented as follows: Index values of the REG bundles to which the CCEs in the first CCE set are mapped are determined according to formula f(x)=x; and index values of the REG bundles to which the CCEs in the second CCE set are mapped are determined according to formula f(x)=x.

Optionally, for the case 3, the non-interleave mapping manner may be implemented as follows: Index values of the REG bundles to which the CCEs in the first CCE set are mapped are determined according to formula f(x)=x; and index values of the REG bundles to which the CCEs in the second CCE set are mapped are determined according to a formula (12).

The formula (12) may be as follows:

$$f(x)=x+N_{CCE,p,first}. \tag{12}$$

x represents an input sequence number corresponding to the CCE, and f(x) represents an index value of the REG bundle.

It should be understood that in the non-interleave mapping manner, an input sequence number corresponding to the CCE is an index value of the CCE.

2. First interleave mapping manner

The first interleave mapping manner is applicable to a case in which the REG bundles are numbered in the numbering manner 1-1 and the CCEs are numbered in the numbering manner 2-1.

Optionally, the first interleave mapping manner may be implemented as follows: determining one or more corresponding input sequence numbers based on an index value of a CCE; and determining an index value of a corresponding REG bundle based on an index value of each input sequence number according to a formula (13).

Several input sequence numbers corresponding to the CCE whose index value is j are respectively $$\frac{6j}{k},\ \frac{6j}{k}+1,\ \ldots ,\ \frac{6j}{k}+\frac{b}{k}-1.$$

The formula (13) is as follows:

$$f(x) = (rC + c + n_{shift})\mathrm{mod}\left( \frac{N_{REG}^{CORESET}}{K} \right) \tag{13}$$

$$x = cR + r$$

$$r = 0,1, \ldots , R-1$$

$$c = 0,1, \ldots , C-1$$

$$C = \frac{N_{REG}^{CORESET}}{KR}$$

3. Second interleave mapping manner

The second interleave mapping manner is applicable to the following three cases:

Case 1: The REG bundles are numbered in the numbering manner 1-1, and the CCEs are numbered in the numbering manner 2-1.

Case 2: The REG bundles are numbered in the numbering manner 1-2, and the CCEs are numbered in the numbering manner 2-2.

Case 3: The REG bundles are numbered in the numbering manner 1-1, and the CCEs are numbered in the numbering manner 2-2.

Optionally, for the case 1, the second interleave mapping manner may be implemented as follows: determining one or more corresponding input sequence numbers based on an index value of a CCE in the first CCE set; and determining an index value of a corresponding REG bundle based on each input sequence number corresponding to the CCE in the first CCE set according to a formula (14); and determining one or more corresponding input sequence numbers based on an index value of a CCE in the second CCE set; and determining an index value of a corresponding REG bundle based on each input sequence number corresponding to the CCE in the second CCE set according to a formula (15).

The formula (14) may be as follows:

$$f(x) = (rC + c + n_{shift})\mathrm{mod}\left( \frac{N_{REG,1}^{CORESET}}{K} \right) \tag{14}$$

$$x = cR + r$$

$$r = 0,1, \ldots , R-1$$

$$c = 0,1, \ldots , C-1$$

$$C = \frac{N_{REG,1}^{CORESET}}{KR}$$

$$N_{REG,1}^{CORESET}$$

represents the quantity of REGs included in the first physical time-frequency resource area.

The formula (15) is as follows:

$$f(x) = (rC + c + n_{shift})\mathrm{mod}\left( \frac{N_{REG,2}^{CORESET}}{K} \right) + \frac{N_{REG,1}^{CORESET}}{K} \tag{15}$$

$$x = cR + r + \frac{N_{REG,1}^{CORESET}}{K}$$

-continued $$r = 0,1, \ldots, R-1$$

$$c = 0,1, \ldots, C-1$$

$$C = \frac{N_{REG,2}^{CORESET}}{KR}$$

$$N_{REG,1}^{CORESET}$$

represents the quantity of REGs included in the first physical time-frequency resource area, and $$N_{REG,2}^{CORESET}$$

represents the quantity of REGs included in the second physical time-frequency resource area.

Optionally, for the case 2, the second interleave mapping manner may be implemented as follows: determining one or more corresponding input sequence numbers based on an index value of a CCE in the first CCE set; and determining an index value of a corresponding REG bundle based on each input sequence number corresponding to the CCE in the first CCE set according to the formula (14). determining one or more corresponding input sequence numbers based on an index value of a CCE in the second CCE set; and determining an index value of a corresponding REG bundle based on each input sequence number corresponding to the CCE in the second CCE set according to a formula (16).

The formula (16) is as follows:

$$f(x) = (rC + c + n_{shift}) \bmod \left( \frac{N_{REG,2}^{CORESET}}{K} \right) + \frac{N_{REG,1}^{CORESET}}{K} \qquad (16)$$

$$x = cR + r$$

$$r = 0,1, \ldots, R-1$$

$$c = 0,1, \ldots, C-1$$

$$C = \frac{N_{REG,2}^{CORESET}}{KR}$$

$$N_{REG,1}^{CORESET}$$

represents the quantity of REGs included in the first physical time-frequency resource area, and $$N_{REG,2}^{CORESET}$$

represents the quantity of REGs included in the second physical time-frequency resource area.

Optionally, for the case 3, the second interleave mapping manner may be implemented as follows: determining one or more corresponding input sequence numbers based on an index values of a CCE in the first CCE set; and determining an index value of a corresponding REG bundle based on each input sequence number corresponding to the CCE in the first CCE set according to the formula (14). determining one or more corresponding input sequence numbers based on an index value of a CCE in the second CCE set; and determining an index value of a corresponding REG bundle based on each input sequence number corresponding to the CCE in the second CCE set according to a formula (17).

The formula (17) is as follows:

$$f(x) = (rC + c + n_{shift}) \bmod \left( \frac{N_{REG,2}^{CORESET}}{K} \right) \qquad (16)$$

$$x = cR + r$$

$$r = 0,1, \ldots, R-1$$

$$c = 0,1, \ldots, C-1$$

$$C = \frac{N_{REG,2}^{CORESET}}{KR}$$

$$N_{REG,2}^{CORESET}$$

represents the quantity of REGs included in the second physical time-frequency resource area.

The following describes, by using examples, the resource determining method shown in FIG. 10, to facilitate understanding of a person skilled in the art. In the following examples, the REG bundles in the CORESET are numbered in the numbering manner 1-1. In addition, in the following examples, n=m=L/2.

EXAMPLE 1

An example is provided based on the CORESET shown in FIG. 6(a). The CORESET shown in FIG. 6(a) includes REG bundles whose index values are 0 to 23. It is assumed that the first physical time-frequency resource area includes REG bundles whose index values are 0 to 11, and the second physical time-frequency resource area includes REG bundles whose index values are 12 to 23. Therefore, the first CCE set includes 12 CCEs, and the second CCE set includes 12 CCEs.

When the CCEs are numbered in the numbering manner 2-1, numbers of the CCEs in the first CCE set are sequentially 0, 1, 2, 3, 4, 5, 6, 7, 8, 9, 10, and 11. Numbers of the CCEs in the second CCE set are sequentially 12, 13, 14, 15, 16, 17, 18, 19, 20, 21, 22, and 23.

For a PDCCH candidate whose aggregation level is 8, assuming that the communications device calculates that $$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\}$$

is equal to 0, according to the conventional technology, the PDCCH candidate occupies the CCE 0 to the CCE 7. However, when $$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\}$$

is equal to 0, based on the resource determining method shown in FIG. 10, if the relationship between the first index value and the second index value meets the rule 1, and the CCEs are numbered in the numbering manner 2-1, the communications device can determine that the PDCCH candidate occupies the CCE 0 to the CCE 3 in the first CCE set, and occupies the CCE 12 to the CCE 15 in the second CCE set.

As shown in FIG. 14, when the non-interleave mapping manner is used, the CCE 0 in the first CCE set is mapped to a REG bundle whose index value is 0, the CCE 1 in the first CCE set is mapped to a REG bundle whose index value is 1, the CCE 2 in the first CCE set is mapped to a REG bundle whose index value is 2, and the CCE 3 in the first CCE set is mapped to a REG bundle whose index value is 3. In addition, the CCE 12 in the second CCE set is mapped to a REG bundle whose index value is 12, the CCE 13 in the second CCE set is mapped to a REG bundle whose index value is 13, the CCE 14 in the second CCE set is mapped to a REG bundle whose index value is 14, and the CCE 15 in the second CCE set is mapped to a REG bundle whose index value is 15.

Figures 7A, 7B:
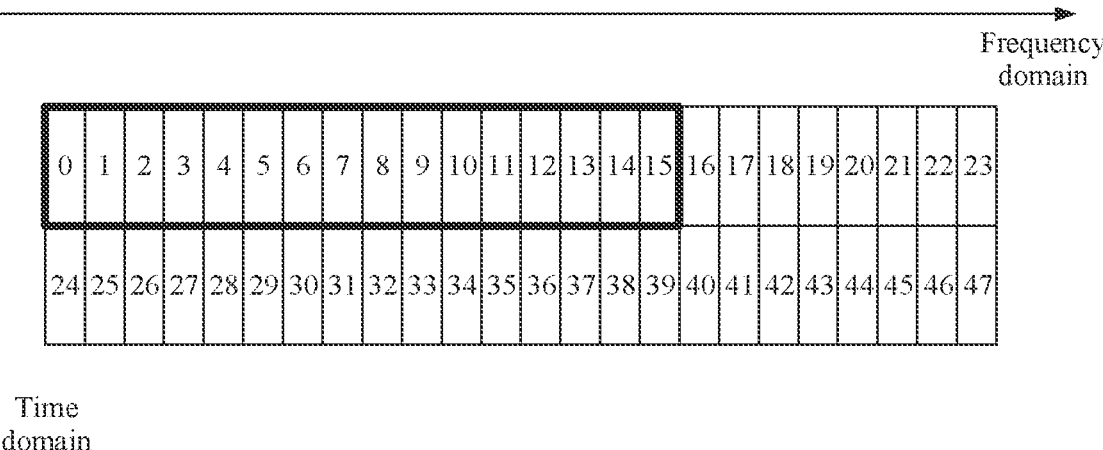
FIG. 7(a) is a schematic diagram of a PDCCH candidate of a REDCAP terminal device in a related technology.
FIG. 7(b) is a schematic diagram of a PDCCH candidate of another REDCAP terminal device in a related technology.

That is, when the non-interleave mapping manner is used, as shown in FIG. 7(a), the PDCCH candidate determined in the conventional technology occupies the REG bundles whose index values are 0 to 7. As shown in FIG. 14, the PDCCH candidate determined based on the embodiment shown in FIG. 10 occupies the REG bundles whose index values are 0 to 3 and the REG bundles whose index values are 12 to 15. With reference to FIG. 7(a) and FIG. 14, it can be learned that, compared with the REG bundles whose index values are 0 to 7, the REG bundles whose index values are 0 to 3 and the REG bundles whose index values are 12 to 15 are located at different time domain positions. Therefore, the PDCCH candidate determined based on the embodiment shown in FIG. 10 can obtain a higher time domain diversity gain.

As shown in FIG. 15, when the first interleave mapping manner is used, the CCE 0 in the first CCE set is mapped to a REG bundle whose index value is 0, the CCE 1 in the first CCE set is mapped to a REG bundle whose index value is 12, the CCE 2 in the first CCE set is mapped to a REG bundle whose index value is 1, and the CCE 3 in the first CCE set is mapped to a REG bundle whose index value is 13. In addition, the CCE 12 in the second CCE set is mapped to a REG bundle whose index value is 6, the CCE 13 in the second CCE set is mapped to a REG bundle whose index value is 18, the CCE 14 in the second CCE set is mapped to a REG bundle whose index value is 7, and the CCE 15 in the second CCE set is mapped to a REG bundle whose index value is 19.

In other words, when the first interleave mapping manner is used, as shown in FIG. 8(a), the PDCCH candidate determined in the conventional technology occupies the REG bundles whose index values are 0 to 3 and 12 to 15. As shown in FIG. 15, the PDCCH candidate determined based on the embodiment shown in FIG. 10 occupies the REG bundles whose index values are 0, 1, 6, 7, 12, 13, 18, and 19. With reference to FIG. 8(a) and FIG. 15, it can be learned that compared with the REG bundles whose index values are 0 to 3 and the REG bundles whose index values are 12 to 15, the REG bundles whose index values are 0, 1, 6, 7, 12, 13, 18, and 19 are distributed more discretely in frequency domain. Therefore, the PDCCH candidate determined based on the embodiment shown in FIG. 10 can obtain a higher frequency domain diversity gain.

As shown in FIG. 16, when the second interleave mapping manner is used, the CCE 0 in the first CCE set is mapped to a REG bundle whose index value is 0, the CCE 1 in the first CCE set is mapped to a REG bundle whose index value is 6, the CCE 2 in the first CCE set is mapped to a REG bundle whose index value is 1, and the CCE 3 in the first CCE set is mapped to a REG bundle whose index value is 7. In addition, the CCE 12 in the second CCE set is mapped to a REG bundle whose index value is 12, the CCE 13 in the second. CCE set is mapped to a REG bundle whose index value is 18, the CCE 14 in the second CCE set is mapped to a REG bundle whose index value is 13, and the CCE 15 in the second CCE set is mapped to a REG bundle whose index value is 19.

In other words, when the second interleave mapping manner is used, as shown in FIG. 9(a), the PDCCH candidate determined in the conventional technology occupies the REG bundles whose index values are 0 to 3 and 6 to 9. As shown in FIG. 16, the PDCCH candidate determined based on the embodiment shown in FIG. 10 occupies the REG bundles whose index values are 0, 1, 6, 7, 12, 13, 18, and 19. With reference to FIG. 9(a) and FIG. 16, it can be learned that compared with the REG bundles whose index values are 0 to 3 and the REG bundles whose index values are 6 to 9, the REG bundles whose index values are 0, 1, 6, 7, 12, 13, 18, and 19 are distributed more discretely in time domain. Therefore, the PDCCH candidate determined based on the embodiment shown in FIG. 10 can obtain a higher time domain diversity gain.

EXAMPLE 2

An example is provided based on the CORESET shown in FIG. 6(a). The CORESET shown in FIG. 6(a) includes REG bundles whose index values are 0 to 23. It is assumed that the first physical time-frequency resource area includes REG bundles whose index values are 0 to 11, and the second physical time-frequency resource area includes REG bundles whose index values are 12 to 23. Therefore, the first CCE set includes 12 CCEs, and the second CCE set includes 12 CCEs.

When the CCEs are numbered in the numbering manner 2-1, numbers of the CCEs in the first CCE set are sequentially 0, 1, 2, 3, 4, 5, 6, 7, 8, 9, 10, and 11. Numbers of the CCEs in the second CCE set are sequentially 12, 13, 14, 15, 16, 17, 18, 19, 20, 21, 22, and 23.

For a PDCCH candidate whose aggregation level is 8, assuming that the communications device calculates that $$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{cce,p}}{L} \right\rfloor \right\}$$

is equal to 0, according to the conventional technology, the PDCCH candidate occupies the CCE 0 to the CCE 7. However, when $$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{cce,p}}{L} \right\rfloor \right\}$$

is equal to 0, based on the resource determining method shown in FIG. 10, if the relationship between the first index value and the second index value are determined based on a preset value and an offset value, the offset value is 4, and the CCEs are numbered in the numbering manner 2-1, the communications device can determine that the PDCCH candidate occupies the CCE 0 to the CCE 3 in the first CCE set, and occupies the CCE 16 to the CCE 19 in the second CCE set.

As shown in FIG. 17, when the non-interleave mapping manner is used, the CCE 0 in the first CCE set is mapped to a REG bundle whose index value is 0, the CCE 1 in the first CCE set is mapped to a REG bundle whose index value is 1, the CCE 2 in the first CCE set is mapped to a REG bundle whose index value is 2, and the CCE 3 in the first CCE set is mapped to a REG bundle whose index value is 3. In addition, the CCE 16 in the second CCE set is mapped to a REG bundle whose index value is 16, the CCE 17 in the second CCE set is mapped to a REG bundle whose index value is 17, the CCE 18 in the second CCE set is mapped to a REG bundle whose index value is 18, and the CCE 19 in the second CCE set is mapped to a REG bundle whose index value is 19.

That is, when the non-interleave mapping manner is used, as shown in FIG. 7(a), the PDCCH candidate determined in the conventional technology occupies the REG bundles whose index values are 0 to 7. As shown in FIG. 17, the PDCCH candidate determined based on the embodiment shown in FIG. 10 occupies the REG bundles whose index values are 0 to 3 and 16 to 19. With reference to FIG. 7(a) and FIG. 17, it can be learned that compared with the REG bundles whose index values are 0 to 7, the REG bundles whose index values are 0 to 3 and 16 to 19 are located at different time domain positions. Therefore, the PDCCH candidate determined based on the embodiment shown in FIG. 10 can obtain a higher time domain diversity gain. In addition, with reference to FIG. 14 and FIG. 17, it can be learned that, compared with the PDCCH candidate that meets the rule 1, physical time-frequency resources occupied by the PDCCH candidate that meets the rule 2 are more dispersed in frequency domain, so that the PDCCH candidate that meets the rule 2 can obtain a higher frequency domain diversity gain.

As shown in FIG. 18, when the first interleave mapping manner is used, the CCE 0 in the first CCE set is mapped to a REG bundle whose index value is 0, the CCE 1 in the first CCE set is mapped to a REG bundle whose index value is 12, the CCE 2 in the first CCE set is mapped to a REG bundle whose index value is 1, and the CCE 3 in the first CCE set is mapped to a REG bundle whose index value is 13. In addition, the CCE 16 in the second CCE set is mapped to a REG bundle whose index value is 8, the CCE 17 in the second CCE set is mapped to a REG bundle whose index value is 20, the CCE 18 in the second CCE set is mapped to a REG bundle whose index value is 9, and the CCE 19 in the second CCE set is mapped to a REG bundle whose index value is 21.

In other words, when the first interleave mapping manner is used, as shown in FIG. 8(a), the PDCCH candidate determined in the conventional technology occupies the REG bundles whose index values are 0 to 3 and 12 to 15. As shown in FIG. 18, the PDCCH candidate determined based on the embodiment shown in FIG. 10 occupies REG bundles whose index values are 0, 1, 8, 9, 12, 13, 20, and 21. With reference to FIG. 8(a) and FIG. 18, it can be learned that compared with the REG bundles whose index values are 0 to 3 and the REG bundles whose index values are 12 to 15, the REG bundles whose index values are 0, 1, 8, 9, 12, 13, 20, and 21 are distributed more discretely in frequency domain. Therefore, the PDCCH candidate determined based on the embodiment shown in FIG. 10 can obtain a higher frequency domain diversity gain. In addition, with reference to FIG. 15 and FIG. 18, it can be learned that compared with the PDCCH candidate that meets the rule 1, physical time-frequency resources occupied by the PDCCH candidate that meets the rule 2 are more dispersed in frequency domain, so that the PDCCH candidate that meets the rule 2 can obtain a higher frequency domain diversity gain.

Figures 19, 20:
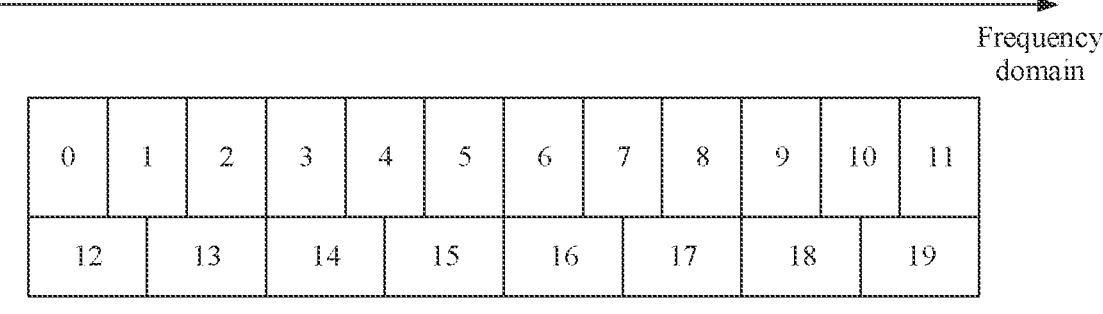
FIG. 19 is a schematic diagram of a PDCCH candidate according to an embodiment of this application.
FIG. 20 is a schematic diagram of a CORESET according to an embodiment of this application.

As shown in FIG. 19, when the second interleave mapping manner is used, the CCE 0 in the first CCE set is mapped to a REG bundle whose index value is 0, the CCE 1 in the first CCE set is mapped to a REG bundle whose index value is 6, the CCE 2 in the first CCE set is mapped to a REG bundle whose index value is 1, and the CCE 3 in the first CCE set is mapped to a REG bundle whose index value is 7. In addition, the CCE 16 in the second CCE set is mapped to a REG bundle whose index value is 14, the CCE 17 in the second CCE set is mapped to a REG bundle whose index value is 20, the CCE 18 in the second CCE set is mapped to a REG bundle whose index value is 15, and the CCE 19 in the second CCE set is mapped to a REG bundle whose index value is 21.

In other words, when the second interleave mapping manner is used, as shown in FIG. 9(a), the PDCCH candidate determined in the conventional technology occupies the REG bundles whose index values are 0 to 3 and 6 to 9. As shown in FIG. 19, the PDCCH candidate determined based on the embodiment shown in FIG. 10 occupies the REG bundles whose index values are 0, 1, 6, 7, 14, 15, 20, and 21. With reference to FIG. 9(a) and FIG. 19, it can be learned that compared with the REG bundles whose index values are 0 to 3 and the REG bundles whose index values are 6 to 9, the REG bundles whose index values are 0, 1, 6, 7, 14, 15, 20, and 21 are distributed more discretely in time domain. Therefore, the PDCCH candidate determined based on the embodiment shown in FIG. 10 can obtain a higher time domain diversity gain. In addition, with reference to FIG. 16 and FIG. 19, it can be learned that compared with the PDCCH candidate that meets the rule 1, physical time-frequency resources occupied by the PDCCH candidate that meets the rule 2 are more dispersed in frequency domain, so that the PDCCH candidate that meets the rule 2 can obtain a higher frequency domain diversity gain.

Currently, in some scenarios, a quantity of REGs included in the first physical time-frequency resource area is greater than that of REGs included in the second physical time-frequency resource area. For example, as shown in FIG. 20, the CORESET includes 20 REG bundles, the first physical time-frequency resource area includes REG bundles whose index values are 0 to 11, and the second physical time-frequency resource area includes REG bundles whose index values are 12 to 19. In this case, the quantity of CCEs included in the first CCE set is greater than the quantity of CCEs included in the second CCE set.

Optionally, for this case, based on the embodiment shown in FIG. 10, as shown in FIG. 21, before step S101, the resource determining method further includes step S201.

S201: The communications device determines whether the second CCE set can provide m second CCEs for a PDCCH candidate whose number is $m_{s,n_{CI}}$ and whose aggregation level is L.

In a possible implementation, when a third formula is satisfied, the communications device determines that the second CCE set can provide m second CCEs for the PDCCH candidate whose number is $m_{s,n_{CI}}$ and whose aggregation level is L. When a seventh formula is not satisfied, the communications device determines that the second CCE set cannot provide m second CCEs for the PDCCH candidate whose number is $m_{s,n_{CI}}$ and whose aggregation level is L.

In a possible design, when the CCEs in the CORESET are numbered in the numbering manner 2-1, the third formula may be as shown in the following formula (18):

$$\frac{L}{2}\cdot\left\{\left(\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\left\lfloor\frac{N_{cce,p}}{L}\right\rfloor+1\right)+N_{CCE,p,first}>\right. \qquad (18)$$
$$\left\lfloor\frac{N_{cce,p}}{L}\right\rfloor\cdot L$$

In another possible design, when the CCEs in the CORESET are numbered in the numbering manner 2-2, the third formula may be as shown in the following formula (19):

$$\frac{L}{2}\cdot\left\{\left(\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\left\lfloor\frac{N_{cce,p}}{L}\right\rfloor+1\right)\right\}> \qquad (19)$$
$$\left\lfloor\frac{N_{cce,p}}{L}\right\rfloor\cdot L$$

It should be understood that when the second CCE set can provide m CCEs for the PDCCH candidate whose number is $m_{s,n_{CI}}$ and whose aggregation level is L, the communications device performs the following steps S101 and S102.

When the second CCE set cannot provide m CCEs for the PDCCH candidate whose number is $m_{s,n_{CI}}$ and whose aggregation level is L, the communications device determines, based on the foregoing formula (1), L consecutive CCEs occupied by the PDCCH candidate whose number is $m_{s,n_{CI}}$ and whose aggregation level is L. Further, the communications device determines, based on the L consecutive CCEs, a physical time-frequency resource occupied by the PDCCH candidate.

Currently, for a REDCAP terminal device, an interleaving manner in the conventional technology cannot enable a PDCCH candidate to obtain a good frequency diversity gain.

An example is used for description with reference to FIG. 22. It is assumed that a REG bundle size in a CORESET is 6, and the CORESET includes REG bundles whose index values are 0 to 23. For example, an aggregation level is 4. It is assumed that a PDCCH candidate occupies a CCE 0 to a CCE 3. When the existing interleaving manner is used and an interleaving depth is 2, the CCE 0 is mapped to the REG bundle whose index value is 0, the CCE 1 is mapped to the REG bundle whose index value is 12, the CCE 2 is mapped to the REG bundle whose index value is 2, and the CCE 3 is mapped to the REG bundle whose index value is 13. It can be learned that the PDCCH candidate occupies the REG bundles whose index values are 0, 1, 12, and 13. Because the REG bundles whose index values are 0 and 12 are adjacent to the REG bundles whose index values are 1 and 13, the PDCCH candidate cannot obtain an effective frequency diversity gain.

Figure 23:
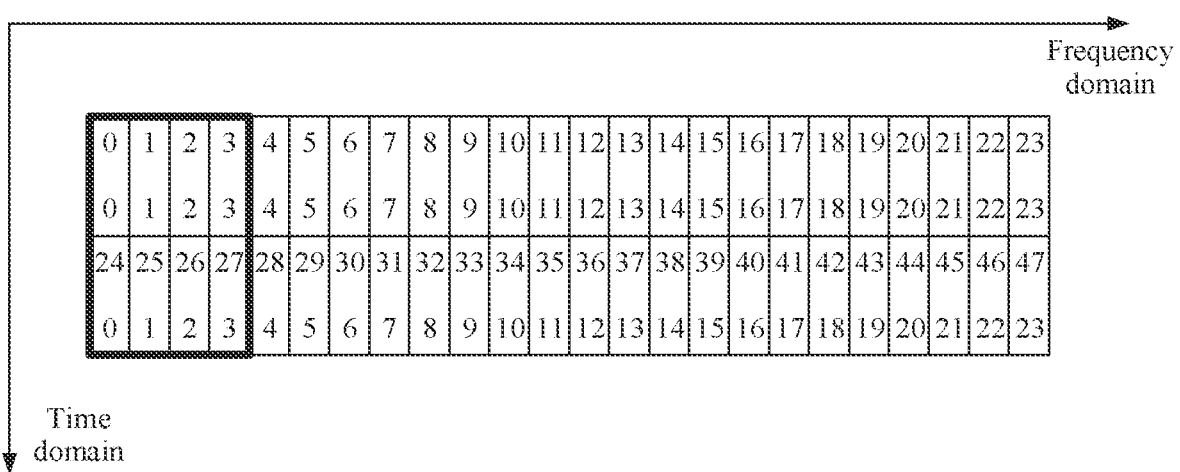
FIG. 23 is a schematic diagram of a PDCCH candidate of another REDCAP terminal device in a related technology.

An example is used for description with reference to FIG. 23. It is assumed that a REG bundle size in a CORESET is 3, and the CORESET includes REG bundles whose index values are 0 to 47. For example, an aggregation level is 4. It is assumed that the PDCCH candidate occupies a CCE 0 to a CCE 3. When the existing interleaving manner is used and an interleaving depth is 2, the CCE 0 is mapped to the REG bundles whose index values are 0 and 24, the CCE 1 is mapped to the REG bundles whose index values are 1 and 25, the CCE 2 is mapped to the REG bundles whose index values are 2 and 26, and the CCE 3 is mapped to the REG bundles whose index values are 3 and 27. It can be learned that the PDCCH candidate occupies the REG bundles whose index values are 0, 1, 2, 3, 24, 25, 26, and 27. Because the REG bundles whose index values are 0, 1, 2, 3, 24, 25, 26, and 27 gather together in frequency domain, the PDCCH candidate cannot obtain an effective frequency diversity gain.

To resolve the foregoing technical problem, this application provides a resource determining method. An idea of the method is to improve an interleaving manner in the conventional technology, so that L CCEs occupied by a PDCCH candidate may be mapped to several discrete REG bundles. In this way, the PDCCH candidate can obtain a higher diversity gain.

Figure 24:
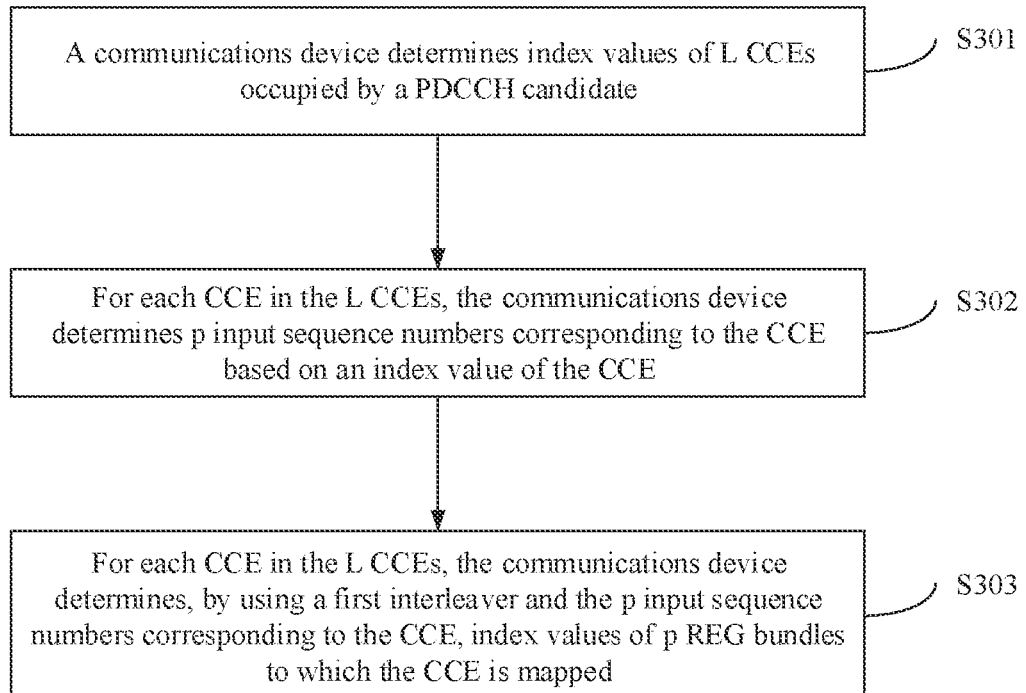
FIG. 24 is a flowchart of a resource determining method according to an embodiment of this application.

FIG. 24 shows a resource determining method according to an embodiment of this application. The method includes the following steps:

S301: A communications device determines index values of L CCEs occupied by a PDCCH candidate.

In an implementation, the communications device determines, based on the foregoing formula (1), the index values of the L CCEs occupied by the PDCCH candidate.

S302: For each CCE in the L CCEs, the communications device determines p input sequence numbers corresponding to the CCE based on an index value of the CCE.

p is a positive integer. It should be understood that p is determined based on a quantity of REGs occupied by the CCE and a REG bundle size configured for a CORESET. For example, when one CCE occupies six REGs, p=6/K. K represents the REG bundle size.

It is assumed that an index value of a CCE is i, and p input sequence numbers of the CCE are respectively $$\frac{6i}{K}, \frac{6i}{K}+1, \dots, \frac{6i}{K}-\frac{6}{K}-1.$$

S303: For each CCE in the L CCEs, the communications device determines, by using a first interleaver and the p input sequence numbers corresponding to the CCE, index values of p REG bundles to which the CCE is mapped.

The first interleaver is configured to output two input sequence numbers at an interval of an interleaving depth as index values corresponding to two REG bundles that are not adjacent in frequency domain.

It should be understood that, two REG bundles not being adjacent in frequency domain means that RBs occupied by one REG bundle and RBs occupied by another REG bundle are inconsecutive in frequency domain.

Based on the embodiment shown in FIG. 24, because a REDCAP terminal device generally uses a large aggregation level, there may be two input sequence numbers with an interval of an interleaving depth in several input sequence numbers corresponding to the L CCEs occupied by a PDCCH candidate of the REDCAP terminal device. The first interleaver provided in this embodiment of this application is configured to output two input sequence numbers at an interval of an interleaving depth as index values corresponding to two REG bundles that are not adjacent in frequency domain. Therefore, there may be at least two REG bundles that are not adjacent in frequency domain in several REG bundles occupied by the PDCCH candidate, so that a probability that the REG bundles occupied by the PDCCH candidate gather together is reduced, thereby improving a frequency diversity gain obtained by the PDCCH candidate.

For example, an example is used for description with reference to FIG. 25. In FIG. 25, a REG bundle size configured for a CORESET is 6, and the CORESET includes REG bundles whose index values are 0 to 23. It should be understood that because the REG bundle is 6, the index value of the CCE is the input sequence number corresponding to the CCE. In FIG. 25, a number in the first row of the rectangular block represents an index value of the REG bundle, and a number in the second row represents a corresponding input sequence number. Refer to FIG. 25. When the interleaving depth is 2, the first interleaver provided in this embodiment of this application may be configured to: output an input sequence number 0 as an index value 0 of a REG bundle, output an input sequence number 4 as an index value 1 of a REG bundle, output an input sequence number 8 as an index value 2 of a REG bundle, output an input sequence number 12 as an index value 3 of a REG bundle, output an input sequence number 16 as an index value 4 of a REG bundle, output an input sequence number 20 as an index value 5 of a REG bundle, output an input sequence number 2 as an index value 6 of a REG bundle, output an input sequence number 6 as an index value 7 of a REG bundle, output an input sequence number 10 as an index value 8 of a REG bundle, output an input sequence number 14 as an index value 9 of a REG bundle, output an input sequence number 18 as an index value 10 of a REG bundle, output an input sequence number 22 as an index value 11 of a REG bundle, output an input sequence number 1 as an index value 12 of a REG bundle, output an input sequence number 5 as an index value 13 of a REG bundle, output an input sequence number 9 as an index value 14 of a REG bundle, output an input sequence number 13 as an index value 15 of a REG bundle, output an input sequence number 17 as an index value 16 of a REG bundle, output an input sequence number 21 as an index value 17 of a REG bundle, output an input sequence number 3 as an index value 18 of a REG bundle, output an input sequence number 7 as an index value 19 of a REG bundle, output an input sequence number 11 as an index value 20 of a REG bundle, output an input sequence number 15 as an index value 21 of a REG bundle, output an input sequence number 19 as an index value 22 of a REG bundle, and output an input sequence number 23 as an index value 23 of a REG bundle.

Based on FIG. 25, it is assumed that the PDCCH candidate occupies a CCE 0 to a CCE 3. Based on the first interleaver, the communications device can determine that the PDCCH candidate occupies REG bundles whose index values are 0, 6, 12, and 18. It can be learned that the CCE 0 is mapped to the REG bundle whose index value is 0, and the CCE 2 is mapped to the REG bundle whose index value is 6. However, the REG bundle whose index value is 0 is not adjacent to the REG bundle whose index value is 6. Therefore, the PDCCH candidate can obtain a good frequency diversity gain.

The following briefly describes a design idea of the first interleaver. It should be understood that the first interleaver may alternatively be designed in another manner, which is not limited to the following content.

Optionally, a design idea of the first interleaver is: determining a three-dimensional number corresponding to an input sequence number; and then determining, based on the three-dimensional number corresponding to the input sequence number, an index value of a REG bundle corresponding to the input sequence number. The three-dimensional number includes a group number, a row number, and a column number.

In this way, compared with an interleaving method in the conventional technology in which an input sequence number is generally mapped to a two-dimensional number (namely, a row number and a column number), in the first interleaver provided in this embodiment of this application, a dimension of number (namely, a group number) is added, so that a result of mapping the input sequence number to an index value of a REG bundle is more discrete, and a result of mapping a CCE to a REG bundle is more discrete.

Design 1: The first interleaver satisfies the following formula (20):

$$f(x) = \left(2r_1 C_1 + r_1 \frac{Q}{R} + c + n_{shift}\right) \bmod \frac{N_{REG}^{CORESET}}{K} \qquad (20)$$

$$x = 2cR + r$$

$$r = r_2 R + r_1$$

$$r_1 = 0, 1, \ldots R - 1$$

$$r_2 = 0, 1$$

$$Q = \begin{cases} C_1 R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \ldots, \frac{N_{REG,1}^{CORESET}}{K} - 1 & r_2 = 0 \\ 0, 1, \ldots, \frac{N_{REG,2}^{CORESET}}{K} - 1 & r_2 = 1 \end{cases}$$

x represents an input sequence number, $r_2$ represents a group number in a three-dimensional number, $r_1$ represents a row number in the three-dimensional number, and c represents a column number in the three-dimensional number.

In this embodiment of this application, R represents an interleaving depth, K represents a REG bundle size, $$N_{REG}^{CORESET}$$

represents a quantity of REGs included in a CORESET, $$N_{REG,1}^{CORESET}$$

represents a quantity of REGs included in a first physical time-frequency resource area in the CORESET, and $$N_{REG,2}^{CORESET}$$

represents a quantity of REGs included in a second physical time-frequency resource area in the CORESET.

It should be understood that in the foregoing formula (20), x=2cR+r and r=r₂R+r₁ are used to determine a three-dimensional number corresponding to an input sequence number. In the foregoing formula (20), $$f(x) = \left(2r_1 C_1 + r_2 \frac{Q}{R} + c + n_{shift}\right) \mathrm{mod} \frac{N_{REG}^{CORESET}}{K}$$

is used to determine an index value of a REG bundle corresponding to the three-dimensional number.

For example, the CORESET shown in FIG. 6(*a*) is used as an example. Based on the first interleaver that satisfies the formula (20), a correspondence between the index value of the CCE and the index value of the REG bundle may be as shown in FIG. 25.

It should be understood that, in the foregoing formula (20), r=r₂R+r₁ is equivalent to one-way interleaving. Therefore, the formula (20) is equivalent to performing two-way interleaving on the input sequence number to obtain the index value of the REG bundle corresponding to the input sequence number.

Design 2: The first interleaver satisfies the following formula (21):

$$f(x) = \left(2r_1 C_1 + ((r_2 + r_1)\mathrm{mod}2)\frac{Q}{R} + c + n_{shift}\right) \mathrm{mod} \frac{N_{REG}^{CORESET}}{K} \quad (21)$$

$$x = 2cR + r$$

$$r = r_2 R + r_1$$

$$r_1 = 0, 1, \ldots R - 1$$

$$r_2 = 0, 1$$

$$Q = \begin{cases} C_1 R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \ldots, \frac{N_{REG,1}^{CORESET}}{K} - 1 \quad r_2 = 0 \\ 0, 1, \ldots, \frac{N_{REG,2}^{CORESET}}{K} - 1 \quad r_2 = 1 \end{cases}$$

For example, the CORESET shown in FIG. 6(*a*) is used as an example. Based on the first interleaver that satisfies the formula (21), when an interleaving depth is 2, a correspondence between the index value of the CCE and the index value of the REG bundle may be as shown in FIG. 26. Refer to FIG. 26. A CCE 0 is mapped to a REG bundle whose index value is 0, and a CCE 1 is mapped to a REG bundle whose index value is 18. In this way, a PDCCH candidate whose aggregation level L is equal to 2 (for example, a PDCCH candidate occupying the CCE 0 and the CCE 1) may also obtain a good frequency diversity gain.

Design 3: The first interleaver satisfies the following formula (22):

$$f(x) = \left(2r_1 C_1 + r_2 \frac{Q}{R} + c + n_{shift,n_{symbol}}\right) \mathrm{mod} \frac{N_{REG}^{CORESET}}{K} \quad (22)$$

$$x = 2cR + r$$

$$r = r_2 R + r_1$$

$$r_1 = 0, 1, \ldots R - 1$$

$$r_2 = 0, 1$$

$$Q = \begin{cases} C_1 R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \ldots, \frac{N_{REG,1}^{CORESET}}{K} - 1 \quad r_2 = 0 \\ 0, 1, \ldots, \frac{N_{REG,2}^{CORESET}}{K} - 1 \quad r_2 = 1 \end{cases}$$

A difference between the formula (22) and the formula (20) lies in that $n_{shift}$ in the formula (20) is replaced with $n_{shift,n_{symbol}}$. It should be understood that $n_{shift}$ is a semi-statically configured parameter, and may be configured by using RRC signaling, a MAC CE, or the like; and $n_{shift,n_{symbol}}$ is a value that changes with time. Therefore, compared with the formula (20), the formula (22) can enable a mapping result of mapping an input sequence number to an index value of a REG bundle to be more randomized in frequency domain, to increase a probability that the PDCCH candidate obtains a good frequency diversity gain.

Optionally, $n_{shift,n_{symbol}}$ may be determined by using function with a time-varying symbol index value.

For example, the CORESET shown in FIG. 6(*a*) is used as an example. Based on the first interleaver that satisfies the formula (22), when an interleaving depth is 2, assuming that $n_{shift,n_{symbol}}=2$ is obtained in a $1^{st}$ area, and $n_{shift,n_{symbol}}=4$ is obtained in a $2^{nd}$ area, the input sequence number and the index value of the REG bundle may be as shown in FIG. 27. It should be understood that when a REG bundle size is 6, the index value of the CCE is the input sequence number.

Refer to FIG. 27, a PDCCH candidate occupying a CCE 0 to a CCE 4 is used as an example. The CCE 0 is mapped to a REG bundle whose index value is 2, the CCE 1 is mapped to a REG bundle whose index value is 16, the CCE 2 is mapped to a REG bundle whose index value is 8, and the CCE 3 is mapped to a REG bundle whose index value is 22. Therefore, it can be learned that the REG bundles occupied by the PDCCH candidate are more discretized in frequency domain, so that the PDCCH candidate can obtain a good frequency diversity gain.

Design 4: The first interleaver satisfies the following formula (23):

$$f(x) = \left(2r_1 C_1 + ((r_2 + r_1)\mathrm{mod}2)\frac{Q}{R} + c + n_{shift,n_{symbol}}\right) \mathrm{mod} \frac{N_{REG}^{CORESET}}{K} \quad (23)$$

$$x = 2cR + r$$

$$r = r_2 R + r_1$$

$$r_1 = 0, 1, \ldots R - 1$$

$$r_2 = 0, 1$$

$$Q = \begin{cases} C_1 R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

-continued $$c = \begin{cases} 0, 1, \dots, \dfrac{N_{REG,1}^{CORESET}}{K} - 1 & r_2 = 0 \\ 0, 1, \dots, \dfrac{N_{REG,2}^{CORESET}}{K} - 1 & r_2 = 1 \end{cases}$$

A difference between the formula (23) and the formula (21) lies in that $n_{shift}$ in the formula (21) is replaced with $n_{shift,n_{symbol}}$. It should be understood that $n_{shift}$ is a semi-statically configured parameter, and $n_{shift,n_{symbol}}$ is a random value. Therefore, compared with the formula (21), the formula (23) can enable a mapping result of mapping an input sequence number to an index value of a REG bundle to be more randomized in frequency domain, to increase a probability that the PDCCH candidate obtains a good frequency diversity gain.

For example, the CORESET shown in FIG. 6($a$) is used as an example. Based on the first interleaver that satisfies the formula (23), when an interleaving depth is 2, assuming that $n_{shift,n_{symbol}}=2$ is obtained in a $1^{st}$ area, and $n_{shift,n_{symbol}}=4$ is obtained in a $2^{nd}$ area, the input sequence number and the index value of the REG bundle may be as shown in FIG. 28. It should be understood that when a REG bundle size is 6, the index value of the CCE is the input sequence number.

Refer to FIG. 28, a PDCCH candidate occupying a CCE 0 to a CCE 4 is used as an example. The CCE 0 is mapped to a REG bundle whose index value is 2, the CCE 1 is mapped to a REG bundle whose index value is 22, the CCE 2 is mapped to a REG bundle whose index value is 8, and the CCE 3 is mapped to a REG bundle whose index value is 16. Therefore, it can be learned that the REG bundles occupied by the PDCCH candidate are more discretized in frequency domain, so that the PDCCH candidate can obtain a good frequency diversity gain.

Optionally, an embodiment of this application further provides a resource determining method, applied to a scenario in which a quantity of REG bundles included in a first physical time-frequency resource area in a CORESET is greater than a quantity of REG bundles included in a second physical time-frequency resource area. As shown in FIG. 29, the resource determining method includes the following steps:

S401: A communications device determines index values of L CCEs occupied by a PDCCH candidate.

In an implementation, the communications device determines, based on the foregoing formula (1), the index values of the L CCEs occupied by the PDCCH candidate.

For each CCE in the L CCEs, the communications device should perform the following step S302.

S402: The communications device determines p input sequence numbers corresponding to the CCE based on an index value of the CCE.

Optionally, p is determined based on a quantity of REGs occupied by the CCE and a REG bundle size configured for the CORESET. For example, when one CCE occupies six REGs, p=6/K. K represents the REG bundle size.

It is assumed that an index value of a CCE is i, and p input sequence numbers of the CCE are respectively $$\frac{6i}{K}, \frac{6i}{K} + 1, \dots, \frac{6i}{K} + \frac{6}{K} - 1.$$

For any one of the P input sequence numbers corresponding to the CCE, the communications device needs to perform the following step S303.

S403: The communications device determines whether the input sequence number meets a preset condition.

In a possible design, the preset condition is whether the input sequence number is less than twice a quantity of REG bundles included in a second physical time-frequency resource area.

For example, the preset condition may be represented by using a formula (24).

$$x < 2 \frac{N_{REG,2}^{CORESET}}{K} \tag{24}$$

It should be understood that, an objective of determining, by the communications device, whether the input sequence number meets the preset condition is to determine whether the second physical time-frequency resource area has sufficient REG bundles for mapping.

When the preset condition is met, the communications device performs the following step S304; otherwise, the communications device performs the following step S305.

S404: The communications device determines, based on the first interleaver and the input sequence number, an index value of a REG bundle corresponding to the input sequence number.

For related descriptions of the first interleaver, refer to the foregoing descriptions. Details are not described herein again.

S405: The communications device determines, based on a second interleaver and the input sequence number, an index value of a REG bundle corresponding to the input sequence number.

For example, the second interleaver satisfies the following formula (25):

$$f(x) = (2rC_1 + c + n_{shift}) \bmod \frac{N_{REG,1}^{CORESET}}{K} \tag{25}$$

$$x = cR + r + \frac{N_{REG,2}^{CORESET}}{K}$$

For example, FIG. 20 is a schematic diagram of a CORESET. The CORESET includes 20 REG bundles, and a REG bundle size is 6. A first physical time-frequency resource area includes REG bundles whose index values are 0 to 11, and a second physical time-frequency resource area includes REG bundles whose index values are 12 to 19.

The following uses an example to describe the embodiment shown in FIG. 29 based on the CORESET shown in FIG. 20.

Example 1: In an example in which the first interleaver satisfies the foregoing formula (20), when an interleaving depth is 2, the first interleaver is responsible for mapping of input sequence numbers 1 to 15, and the second interleaver is responsible for mapping of input sequence numbers 16 to 19. Therefore, a correspondence between an input sequence number and an index value of a REG bundle may be shower in FIG. 26.

Figure 30:
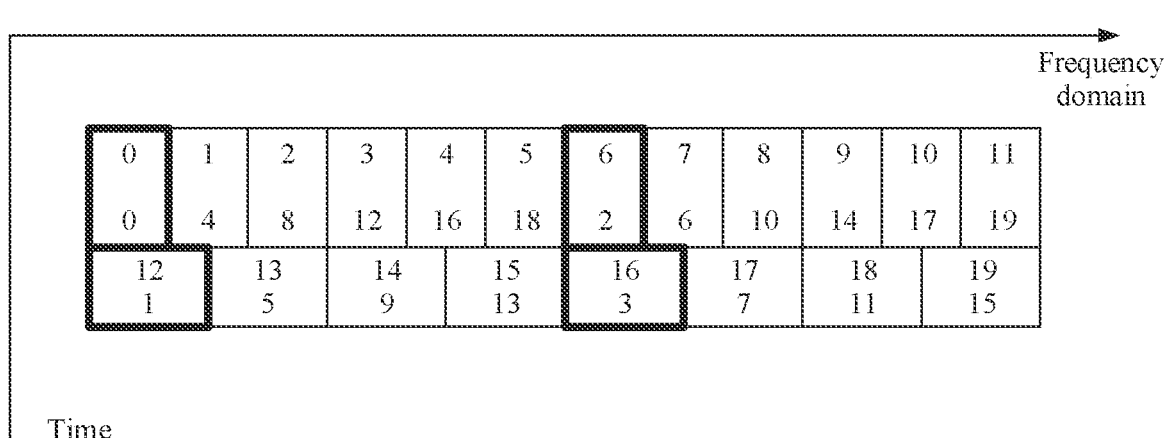
FIG. 30 is a schematic diagram of a correspondence between an input sequence number and an index value of a REG bundle according to an embodiment of this application.

Refer to FIG. 30, a PDCCH candidate occupying a CCE 0 to a CCE 4 is used as an example. The CCE 0 is mapped to a REG bundle whose index value is 0, the CCE 1 is mapped to a REG bundle whose index value is 12, the CCE 2 is mapped to a REG bundle whose index value is 6, and the CCE 3 is mapped to a REG bundle whose index value is 16. Therefore, it can be learned that the REG bundles occupied by the PDCCH candidate are more discretized in frequency domain, so that the PDCCH candidate can obtain a good frequency diversity gain.

Example 2: in an example in which the first interleaver satisfies the foregoing formula (21), when an interleaving depth is 2, the first interleaver is responsible for mapping of input sequence numbers 1 to 15, and the second interleaver is responsible for mapping of input sequence numbers 16 to 19. Therefore, a correspondence between an input sequence number and an index value of a REG bundle may be shown in FIG. 31.

Figure 31:
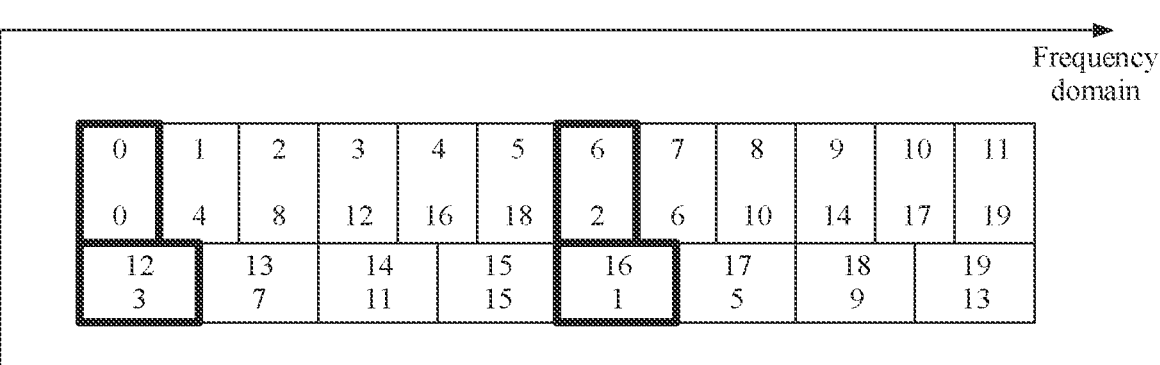
FIG. 31 is a schematic diagram of a correspondence between an input sequence number and an index value of a REG bundle according to an embodiment of this application.

Refer to FIG. 31, a PDCCH candidate occupying a CCE 0 to a CCE 4 is used as an example. The CCE 0 is mapped to a REG bundle whose index value is 0, the CCE 1 is mapped to a REG bundle whose index value is 16, the CCE 2 is mapped to a REG bundle whose index value is 6, and the CCE 3 is mapped to a REG bundle whose index value is 12. Therefore, it can be learned that the REG bundles occupied by the PDCCH candidate are more discretized in frequency domain, so that the PDCCH candidate can obtain a good frequency diversity gain.

Based on the embodiment shown in FIG. 29, in a scenario in which a quantity of REG bundles included in the first physical time-frequency resource area in the CORESET is greater than a quantity of REG bundles included in the second physical time-frequency resource area, it is ensured that the communications device can accurately determine an index value of a REG bundle corresponding to each input sequence number, and a mapping result between the input sequence number and the index value of the REG bundle is more discretized, so that the PDCCH candidate can obtain a good diversity gain.

It may be understood that, to implement the foregoing functions, the communications device includes a corresponding hardware structure and/or software module for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communications device may be divided into function modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. An example in which each functional module is obtained through division based on each corresponding function is used below for description.

Figure 32:
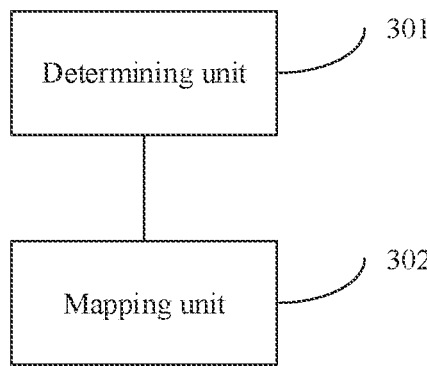
FIG. 32 is a schematic diagram of a structure of a communications apparatus according to an embodiment of this application.

FIG. 32 is a schematic diagram of a structure of a communications apparatus according to an embodiment of this application. The communications apparatus includes a determining unit 301 and a mapping unit 302. The determining unit 301 is configured to support the communications apparatus in performing step S101 in FIG. 10, steps S1011 and S1012 in FIG. 13, step S201 in FIG. 20, and step S301 in FIG. 24. The mapping unit 302 is configured to support the communications apparatus in performing step S102 in FIG. 10 and steps S302 and S303 in FIG. 24. All related content of each step involved in the foregoing method embodiment may be referenced to a function description of a corresponding functional module, and details are not described herein again.

When the communications apparatus is used as a terminal device, both the determining unit 301 and the mapping unit 302 in FIG. 32 may be implemented by a processor 101 in FIG. 2. When the communications apparatus is used as a network device, both the determining unit 301 and the mapping unit 302 in FIG. 32 may be implemented by a processor 201 in FIG. 2.

An embodiment of this application further provides a computer-readable storage medium. The computer-readable storage medium stores computer instructions. When the computer-readable storage medium is run on a computer, the computer is enabled to perform the method provided in the embodiments of this application. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid state disk (solid state disk, SSD)), or the like.

An embodiment of this application further provides a chip. The chip includes a processing circuit and a communications interface. The communications interface is configured to receive an input signal and provide the input signal to the processing module, and/or is configured to process and output a signal generated by the processing circuit. The processing circuit is configured to support the chip in performing the method provided in embodiments of this application. In an implementation, the processing circuit may run code instructions to perform the method provided in embodiments of this application. The code instructions may be from a memory inside the chip, or may be from a memory outside the chip. The processing circuit is a processor, a microprocessor, or an integrated circuit integrated on the chip. The communications interface may be an input/output circuit or a transceiver pin.

An embodiment of this application further provides a computer program product that includes computer instructions. When the computer program product runs on a computer, the computer is enabled to perform the methods provided in embodiments of this application.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A resource determining method, comprising:

determining index values of n first control channel elements (CCEs) occupied by a physical downlink control channel (PDCCH) candidate in a control resource set (CORESET) in a first CCE set, and index values of m second CCEs occupied by the PDCCH candidate in the CORESET in a second CCE set, wherein the CORESET is divided into a first physical time-frequency resource area and a second physical time-frequency resource area, the first physical time-frequency resource area is different from the second physical time-frequency resource area in at least one of time domain or frequency domain, and a quantity of CCEs comprised in the first CCE set is determined based on a quantity of resource element groups (REGs) comprised in the first physical time-frequency resource area; and a quantity of CCEs comprised in the second CCE set is determined based on a quantity of REGs comprised in the second physical time-frequency resource area, wherein both m and n are positive integers, and a sum of m and n is equal to an aggregation level of the PDCCH candidate, wherein the determining index values of n first CCEs occupied by a PDCCH candidate in a CORESET in a first CCE set, and index values of m second CCEs occupied by the PDCCH candidate in the CORESET in a second CCE set comprises:

determining an index value of each first CCE of the n first CCEs according to a first formula that comprises first parameters that limit the each first CCE of the n first CCEs in the first physical time-frequency resource area; and determining an index value of each second CCE of the m second CCEs according to a second formula that comprises second parameters that limit the each second CCE of the m second CCEs in the second physical time-frequency resource area, the second parameters comprise the quantity of CCEs comprised in the first CCE set, and the second formula is different from the first formula in that the second parameters comprise at least one different parameter than the first parameters; and determining, based on the n first CCEs and the m second CCEs, a physical time-frequency resource occupied by the PDCCH candidate.

2. The method according to claim 1, wherein the index values of the n first CCEs are consecutive, and the index values of the m second CCEs are consecutive.

3. The method according to claim 1, wherein n is different from m.

4. The method according to claim 1, wherein the quantity of REGs included in the first physical time-frequency resource area is different from the quantity of REGs included in the second physical time-frequency resource area, and the quantity of CCEs comprised in the first CCE set is different from the quantity of CCEs comprised in the second CCE set.

5. The method according to claim 1, wherein a difference between a first index value and a second index value is a preset value, the first index value is an index value of a first CCE that has a smallest index value in the n first CCEs, and the second index value is an index value of a second CCE that has a smallest index value in the m second CCEs.

6. The method according to claim 5, wherein the first CCE set is numbered from 0, and the second CCE set is numbered from Nez the preset value is equal to $N_{cce,p,first}$, and $N_{cce,p,first}$ indicates the quantity of CCEs comprised in the first CCE set.

7. The method according to claim 6, wherein:

the first formula is shown as follows:

$$\frac{L}{2} \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\} + i$$

$$i = 0, 1, \dots, n-1;$$

the second formula is shown as follows:

$$\frac{L}{2} \cdot \left\{ \left( Y_{p,n_{z,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{cce,p}}{L} \right\rfloor \right\} + i + N_{CCE,p,first}$$

$$i = 0, 1, \dots, m-1;$$

L is the aggregation level of the PDCCH candidate;

when the PDCCH candidate belongs to common search space, $$Y_{p,n_{s,f}^{\mu}} = 0;$$

when the PDCCH candidate belongs to user equipment specific search space, $$Y_{p,n_{s,f}^{\mu}} = \left( A_p \cdot Y_{p,n_{s,f}^{\mu}-1} \right) \bmod D, \; Y_{p,n_{s,f}^{\mu}-1} = n_{RNTI} \neq 0,$$

and $n_{RNTI}$ is a C-RNTI of a terminal device; when pmod3=0, $A_p$=39827; when pmod3=1, $A_p$=39829; when pmod3=2, $A_p$=39839; D=65537; and p is a number of the CORESET;

$m_{s,n_{CI}}$ is a number of the PDCCH candidate, $m_{s,n_{CI}}$ is an integer greater than or equal to 0 and less than or equal to $$M_{s,n,CI}^{(L)} - 1, \text{ and } M_{s,n,CI}^{(L)}$$

is a total quantity of candidate PPDCHs that correspond to a carrier $n_{CI}$ and whose aggregation levels are L in search space s;

$n_{CI}$ is a value of a carrier indicator field;

for the common search space, $$M_{s,max}^{(L)} = M_{s,0}^{(L)};$$

and for the user equipment specific search space, $$M^{(L)}_{s,max}$$

is equal to a maximum value of $$M^{(L)}_{s,nCI}$$

coresponding to all $n_{CI}$; and $N_{CCE,v,first}$ is the quantity of CCEs comprised in the first CCE set.

8. The method according to claim 5, wherein the first CCEs comprised in the first CCE set are numbered from 0, the second CCEs comprised in the second CCE set are numbered from 0, and the preset value is equal to 0.

9. The method according to claim 8, wherein:

the first formula is shown as follows:

$$\frac{L}{2} \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \bmod \left\lfloor \frac{N_{cce,p,first}}{L/2} \right\rfloor \right\} + i$$

$$i = 0, 1, \ldots, n-1;$$

the second formula is shown as follows:

$$\frac{L}{2} \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \bmod \left\lfloor \frac{N_{cce,p,second}}{L/2} \right\rfloor \right\} + j$$

$$j = 0, 1, \ldots, m-1;$$

L is the aggregation level of the PDCCH candidate;

when the PDCCH candidate belongs to common search space, $$Y_{p,n^{\mu}_{s,f}} = 0;$$

when the PDCCH candidate belongs to user equipment specific search space, $$Y_{p,n^{\mu}_{s,f}} = \left( A_p \cdot Y_{p,n^{\mu}_{s,f}-1} \right) \bmod D, \; Y_{p,n^{\mu}_{s,f}-1} = n_{RNTI} \neq 0,$$

and $n_{RNTI}$ is a C-RNTI of a terminal device; when pmod3=0, $A_p$=39827; when pmod3=1, $A_p$=39829; when pmod3=2, $A_p$=39839; D=65537; and p is a number of the CORESET;

$m_{s,n_{CI}}$ is a number of the PDCCH candidate, $m_{s,n_{CI}}$ is an integer greater than or equal to 0 and less than or equal to $$M^{(L)}_{s,nCI} - 1, \text{ and } M^{(L)}_{s,nCI}$$

is a total quantity of candidate PPDCHs that correspond to a carrier $n_{CI}$ and whose aggregation levels are L in search space s;

$n_{CI}$ is a value of a carrier indicator field;

for the common search space, $$M^{(L)}_{s,max} = M^{(L)}_{s,0};$$

and for the user equipment specific search space, $$M^{(L)}_{s,max}$$

is equal to a maximum value of $$M^{(L)}_{s,nCI}$$

corresponding to all $n_{CI}$;

$N_{CCE,p,first}$ is the quantity of CCEs comprised in the first CCE set; and $N_{cce,p,second}$ is the quantity of CCEs comprised in the second CCE set.

10. The method according to claim 1, wherein a difference between a first index value and a second index value is determined based on a preset value and an offset value, the first index value is an index value of a first CCE that has a smallest index value in the n first CCEs, and the second index value is an index value of a second CCE that has a smallest index value in the m second CCEs.

11. The method according to claim 10, wherein:

the first CCE set is numbered from 0, the second CCE set is numbered from $N_{cce,p,first}$, and the preset value is equal to $N_{cce,p,first}$, and $N_{cce,p,first}$ indicates the quantity of CCEs comprised in the first CCE set; or the first CCEs comprised in the first CCE set are numbered from 0, the second CCEs comprised in the first CCE set are numbered from 0, and the preset value is equal to 0.

12. The method according to claim 10, wherein the method comprises:

determining whether the second CCE set is capable of providing the m second CCEs for the PDCCH candidate with a specified number and the aggregation level of L based on a third formula.

13. A resource determining method, comprising:

determining index values of L control channel elements (CCEs) occupied by a physical downlink control channel (PDCCH) candidate in a control resource set (CORESET), wherein the CORESET is divided into a first physical time-frequency resource area and a second physical time-frequency resource area, the first physical time-frequency resource area is different from the second physical time-frequency resource area in time domain and/or frequency domain, and L is equal to an aggregation level of the PDCCH candidate, wherein the determining index values of L CCEs comprises determining index values of n first CCEs occupied by the PDCCH candidate in the CORESET in a first CCE set, and index values of m second CCEs occupied by the PDCCH candidate in the CORESET in a second CCE set by:

determining an index value of each first CCE of the n first CCEs according to a first formula that comprises first parameters that limit the each first CCE of the n first CCEs in the first physical time-frequency resource area; and determining an index value of each second CCE of the m second CCEs according to a second formula that comprises second parameters that limit the each second CCE of the m second CCEs in the second physical time-frequency resource area, the second parameters comprise a quantity of CCEs comprised in the first CCE set, and the second formula is different from the first formula in that the second parameters comprise at least one different parameter than the first parameters;

for each CCE in the L CCEs, determining, based on an index value of the CCE, p input sequence numbers corresponding to the CCE, wherein p is a positive integer; and determining, based on the p input sequence numbers corresponding to the CCE and a first interleaver, index values of p resource element group bundles (REG bundles) to which the CCE is mapped, wherein the first interleaver is configured to output index values of two REG bundles that are not adjacent in frequency domain by using two input sequence numbers that are spaced by an interleaving depth.

14. The method according to claim 13, wherein the determining, based on the p input sequence numbers corresponding to the CCE and a first interleaver, index values of p REG bundles to which the CCE is mapped comprises:

determining, for one of the p input sequence numbers corresponding to the CCE, a three-dimensional number corresponding to the input sequence number, wherein the three-dimensional number comprises a group number, a row number, and a column number; and determining, based on the three-dimensional number corresponding to the input sequence number, an index value of a REG bundle corresponding to the input sequence number.

15. The method according to claim 13, wherein the first interleaver satisfies the following formula:

$$f(x) = \left(2r_1 C_1 + r_2 \frac{Q}{R} + c + n_{shift}\right) \mathrm{mod}\, \frac{N_{REG}^{CORESET}}{K}$$

$$x = 2cR + r$$

$$r = r_2 R + r_1$$

$$r_1 = 0, 1, \dots R-1$$

$$r_2 = 0, 1$$

$$Q = \begin{cases} C_1, R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \dots, \frac{N_{REG,1}^{CORESET}}{K} - 1 \quad r_2 = 0 \\ 0, 1, \dots, \frac{N_{REG,2}^{CORESET}}{K} - 1 \quad r_2 = 1 \end{cases},$$

wherein:

f(x) represents an index value of a REG bundle, x represents an input sequence number, R represents the interleaving depth, K represents a REG bundle size, $$N_{REG}^{CORESET}$$

10 represents a quantity of REGs comprised in the CORE-SET, $$N_{REG,1}^{CORESET}$$

represents a quantity of REGs comprised in the first physical time-frequency resource area in the CORE-SET, $$N_{REG,2}^{CORESET}$$

$N_{REG,2}^{CORESET}$ represents a quantity of REGs comprised in the second physical time-frequency resource area in the CORESET, and $n_{shift}$ is an offset value.

16. The method according to claim 13, wherein the first interleaver satisfies the following formula:

$$f(x) = \left(2r_1 C_1 + ((r_2 + r_1)\mathrm{mod}2)\frac{Q}{R} + c + n_{shift}\right)\mathrm{mod}\,\frac{N_{REG}^{CORESET}}{K}$$

$$x = 2cR + r$$

$$r = r_2 R + r_1$$

$$r_1 = 0, 1, \dots R-1$$

$$r_2 = 0, 1$$

$$Q = \begin{cases} C_1 R, r_2 = 0 \\ C_2 R, r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \dots, \frac{N_{REG,1}^{CORESET}}{K} - 1 \quad r_2 = 0 \\ 0, 1, \dots, \frac{N_{REG,2}^{CORESET}}{K} - 1 \quad r_2 = 1 \end{cases},$$

wherein f(x) represents an index value of a REG bundle, x represents an input sequence number, R represents the interleaving depth, K represents a REG bundle size, $$N_{REG}^{CORESET}$$

represents a quantity of REGs comprised in the CORE-SET, $$N_{REG,1}^{CORESET}$$

represents a quantity of REGs comprised in the first physical time-frequency resource area in the CORE-SET, $$N_{REG,2}^{CORESET}$$

represents a quantity of REGs comprised in the second physical time-frequency resource area in the CORE-SET, and $n_{shift}$ is an offset value.

17. The method according to claim 13, wherein the first interleaver satisfies the following formula:

$$f(x) = \left(2r_1 C_1 + r_2 \frac{Q}{R} + c + n_{shift,n_{symbol}}\right) \bmod \frac{N_{REG}^{CORESET}}{K}$$

$$x = 2cR + r$$

$$r = r_2 R + r_1$$

$$r_1 = 0, 1, \dots R - 1$$

$$r_2 = 0, 1$$

$$Q = \begin{cases} C_1 R, & r_2 = 0 \\ C_2 R, & r_2 = 1 \end{cases}$$

$$C_1 = \frac{N_{REG,1}^{CORESET}}{KR}$$

$$C_2 = \frac{N_{REG,2}^{CORESET}}{KR}$$

$$c = \begin{cases} 0, 1, \dots, \frac{N_{REG,1}^{CORESET}}{K} - 1 & r_2 = 0 \\ 0, 1, \dots, \frac{N_{REG,2}^{CORESET}}{K} - 1 & r_2 = 1 \end{cases},$$

wherein
  f(x) represents an index value of a REG bundle, x represents an input sequence number, R represents the interleaving depth, K represents a REG bundle size, $$N_{REG}^{CORESET}$$

represents a quantity of REGs comprised in the CORE-SET, $N_{REG,1}^{CORESET}$, $$N_{REG,1}^{CORESET}$$

represents a quantity of REGs comprised in the first physical time-frequency resource area in the CORE-SET, $$N_{REG,2}^{CORESET}$$

represents a quantity of REGs comprised in the second physical time-frequency resource area in the CORE-SET, and $n_{shift,n_{symbol}}$ is a value that changes with time.

18. The method according to claim 13, wherein the first interleaver satisfies the following formula:

$$f(x) = \left(2r_1 C_1 + ((r_2 + r_1)\bmod 2)\frac{Q}{R} + + n_{shift,n_{symbol}}\right) \bmod \frac{N_{REG}^{CORESET}}{K}$$

$$x = 2cR + r$$

$$r = r_2 R + r_1$$

$$r_1 = 0, 1, \dots R - 1$$

$$r_2 = 0, 1$$

$$Q = \begin{cases} C_1 R, & r_2 = 0 \\ C_2 R, & r_2 = 1 \end{cases}$$

$$C_1 = \frac{N_{REG,1}^{CORESET}}{KR}$$

$$C_2 = \frac{N_{REG,1}^{CORESET}}{KR}$$

$$c = \begin{cases} 0, 1, \dots, \frac{N_{REG,1}^{CORESET}}{K} - 1 & r_2 = 0 \\ 0, 1, \dots, \frac{N_{REG,2}^{CORESET}}{K} - 1 & r_2 = 1 \end{cases},$$

wherein
  f(x) represents an index value of a REG bundle, x represents an input sequence number, R represents the interleaving depth, K represents a REG bundle size, $$N_{REG}^{CORESET}$$

represents a quantity of REGs comprised in the CORE-SET, $$N_{REG,1}^{CORESET}$$

represents a quantity of REGs comprised in the first physical time-frequency resource area in the CORE-SET, $$N_{REG,2}^{CORESET}$$

represents a quantity of REGs comprised in the second physical time-frequency resource area in the CORE-SET, and $n_{shift,n_{symbol}}$ is a value that changes with time.

19. A communication apparatus, wherein the apparatus comprises at least one processor; and the at least one processor is coupled to at least one memory that stores programming instructions for execution by the at least one processor to perform operations comprising:
  determining index values of n first control channel element (CCEs) occupied by a physical downlink control channel (PDCCH) candidate in a control resource set (CORESET) in a first CCE set, and index values of m second CCEs occupied by the PDCCH candidate in the CORESET in a second CCE set, wherein the CORE-SET is divided into a first physical time-frequency resource area and a second physical time-frequency resource area, the first physical time-frequency resource area is different from the second physical time-frequency resource area in time domain and/or frequency domain, and a quantity of CCEs comprised in the first CCE set is determined based on a quantity of resource element groups (REGs) comprised in the first physical time-frequency resource area; and a quantity of CCEs comprised in the second CCE set is determined based on a quantity of REGs comprised in the second physical time-frequency resource area, wherein both m and n are positive integers, and a sum of m and n is equal to an aggregation level of the PDCCH candidate, wherein the determining index values of n first CCEs occupied by a PDCCH candidate in a CORESET in a first CCE set, and index values of m second CCEs occupied by the PDCCH candidate in the CORESET in a second CCE set comprises:

determining an index value of each first CCE of the n first CCEs according to a first formula that comprises first parameters that limit the each first CCE of the n first CCEs in the first physical time-frequency resource area; and determining an index value of each second CCE of the m second CCEs according to a second formula that comprises second parameters that limit the each second CCE of the m second CCEs in the second physical time-frequency resource area, the second parameters comprise the quantity of CCEs comprised in the first CCE set, and the second formula is different from the first formula in that the second parameters comprise at least one different parameter than the first parameters; and determining, based on the n first CCEs and the m second CCEs, a physical time-frequency resource occupied by the PDCCH candidate.

20. The communications apparatus according to claim 19, wherein the index values of the n first CCEs are consecutive, and the index values of the m second CCEs are consecutive.

* * * * *